US011423470B1

(12) United States Patent
Boyd

(10) Patent No.: US 11,423,470 B1
(45) Date of Patent: Aug. 23, 2022

(54) SYSTEMS AND METHODS FOR ENABLING REMOTE MANAGEMENT OF STORAGE FACILITIES

(71) Applicant: StoreEase, LLC, Homewood, AL (US)

(72) Inventor: Joshua Hamilton Boyd, Birmingham, AL (US)

(73) Assignee: StoreEase, LLC, Homewood, AL (US)

( * ) Notice: Subject to any disclaimer, the term of this patent is extended or adjusted under 35 U.S.C. 154(b) by 0 days.

(21) Appl. No.: 16/858,139

(22) Filed: Apr. 24, 2020

(51) Int. Cl.
*G06Q 30/00* (2012.01)
*G06Q 30/06* (2012.01)
*H04N 7/15* (2006.01)
*G06Q 30/02* (2012.01)

(52) U.S. Cl.
CPC ..... *G06Q 30/0641* (2013.01); *G06Q 30/0281* (2013.01); *G06Q 30/0645* (2013.01); *H04N 7/15* (2013.01)

(58) Field of Classification Search
CPC .......... G06Q 30/0641; G06Q 30/0281; G06Q 30/0645; H04N 7/15
USPC ............................................ 705/27.1, 26, 27
See application file for complete search history.

(56) References Cited

U.S. PATENT DOCUMENTS

| 5,946,660 | A | * | 8/1999 | McCarty | ............ | G07F 17/0042 |
| | | | | | | 705/5 |
| 6,343,314 | B1 | | 1/2002 | Ludwig et al. | | |
| 6,961,707 | B2 | * | 11/2005 | Jenkins | .................. | G06Q 10/02 |
| | | | | | | 705/313 |
| 7,658,327 | B2 | | 2/2010 | Tuchman et al. | | |
| 9,294,719 | B2 | | 3/2016 | Uhma et al. | | |
| 9,516,022 | B2 | * | 12/2016 | Borzycki | ............... | A63F 13/213 |
| 9,679,300 | B2 | | 6/2017 | Lynch et al. | | |
| 9,848,082 | B1 | | 12/2017 | Lillard et al. | | |
| 9,852,487 | B1 | * | 12/2017 | Farnsworth | ............ | G06Q 50/16 |
| 10,152,719 | B2 | * | 12/2018 | Navaratnam | .......... | B25J 11/001 |
| 10,171,659 | B2 | | 1/2019 | Riahi et al. | | |

(Continued)

OTHER PUBLICATIONS

The Self-Storage Building and Facility Automation Experts at Janus International Announce All-New, All-In-One External Smart Lock: Janus Releases "Nokē® One" External, "On-Door" Smart Lock PR Newswire [New York] Apr. 15, 2020; Dialog #2389639590 2pgs. (Year: 2020).*

(Continued)

*Primary Examiner* — Robert M Pond
(74) *Attorney, Agent, or Firm* — Maynard Cooper & Gale, P. C.; Jon E. Holland

(57) ABSTRACT

A system for enabling remote management of storage facilities has a videoconferencing system that allows a remote sales agent to communicate with customers at any of a plurality of storage facilities. When a customer enters a main office of a storage facility, the presence of the customer is sensed by one or more sensor nodes, and the remote sales agent is alerted to the customer's presence. In response, a videoconference call with the sales agent is established so that the customer sees an image of and may interact with the sales agent through the videoconferencing system. After the call, the sale agent may tend to other activities, such as communicating with other customers at the same facility or other storage facilities. If the customer desires to speak with the agent, the customer may provide a user input that automatically establishes a call with the same sales agent, if available.

23 Claims, 10 Drawing Sheets

(56) References Cited

U.S. PATENT DOCUMENTS

| | | | |
|---|---|---|---|
| 10,218,848 B2 | 2/2019 | Deryugin et al. | |
| 10,269,059 B2 | 4/2019 | Hauk | |
| 10,728,392 B1* | 7/2020 | Chandrakant | H04M 3/42365 |
| 11,288,946 B2* | 3/2022 | Wright et al. | G08B 25/10 |
| 2006/0206342 A1* | 9/2006 | Shoen | G06Q 10/0875 705/16 |
| 2009/0093688 A1* | 4/2009 | Mathur | A61B 5/411 600/300 |
| 2010/0030590 A1* | 2/2010 | Sodaro | G06Q 10/02 235/382 |
| 2014/0152806 A1 | 6/2014 | Hauk | |
| 2014/0225981 A1* | 8/2014 | Chen | H04L 65/1069 348/14.09 |
| 2017/0006161 A9 | 1/2017 | Riahi et al. | |
| 2018/0033018 A1* | 2/2018 | Opalka | G06Q 30/016 |
| 2018/0218374 A1 | 8/2018 | Shah et al. | |
| 2018/0232796 A1* | 8/2018 | Glaser | G06Q 40/12 |
| 2019/0042988 A1 | 2/2019 | Brown et al. | |
| 2019/0228601 A1* | 7/2019 | Grzenda | G07C 9/00817 |
| 2019/0342297 A1 | 11/2019 | Adjaoute | |
| 2021/0097792 A1* | 4/2021 | Minsley | G07C 9/00571 |

OTHER PUBLICATIONS

Insomniac Kiosk Available for eMove Storage Affiliates, Business Wire Apr. 25, 2007: NA. Dialog #162513606 2pgs. (Year: 2007).*

Stoic Equity Partners Acquires USD 6.6m Self Storage Asset, M & A Navigator [London] Jan. 31, 2022; Dialog #2623839020 2pgs. (Year: 2022).*

U-Haul Makes Self-Storage Rentals Take Off With S.O.A.R.(SM), PR Newswire [New York] Oct. 2, 2003; Dialog #446898050, 3pgs. (Year: 2003).*

UU: Public Storage Selects OpenTech Alliances Centralized Intelligent Access (CIA) Solution, ICT Monitor Worldwide [Amman] Jul. 21, 2018, Dialog #2072645748, 2pgs. (Year: 2018).*

\* cited by examiner

SYSTEMS AND METHODS FOR ENABLING REMOTE MANAGEMENT OF STORAGE FACILITIES

RELATED ART

Storage facilities often have a large number of storage units that can be rented for storage of personal items. A storage facility typically has a main office located close to (e.g., on the same premises as) the storage units. During normal business hours, at least one sales agent is typically available at the main office to interact with customers, including new customers who may enter the main office for more information on renting storage units. Once a customer decides to rent a storage unit, the sales agent assists the customer with completing the necessary paperwork for the rental, and the sales agent provides the customer with a key to be used to unlock the storage unit being rented. The customer may then proceed to the rented storage unit, use the key to open a door to the storage unit, and then use the storage space within the storage unit to store personal items, such as furniture, equipment, or other items that the customer wishes to store. Thereafter, the customer may close and lock the door and at a later time return to the storage unit to retrieve one or more of the stored items as may be desired.

Maintaining on-site sales agents during normal business hours is costly. Thus, to reduce the costs and overhead of managing several storage facilities, it would be generally desirable to use a smaller number of sales agents who interact with customers from a remote location using teleconferencing or videoconferencing equipment. However, many customers are accustomed to interacting with on-site sales agents and may be weary or uncomfortable about interacting with remote sales agents. Also, if a customer is not immediately engaged by a sales agent upon entering the main office, the customer may become frustrated or confused on how to obtain more information about rentals, thereby reducing the likelihood that the customer will attempt to rent a storage unit. In addition, installing and maintaining equipment for enabling communication between customers and remote sales agents can be expensive. For these and other reasons, widespread adoption of systems for enabling remote management of storage facilities has not yet occurred.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 provides a more detailed view of an exemplary storage facility that may be managed remotely.

DETAILED DESCRIPTION

The present disclosure generally pertains to systems and methods for enabling remote management of storage facilities. A system in accordance with some embodiments of the present disclosure has a videoconferencing system that allows a remote sales agent to communicate with customers at any of a plurality of storage facilities. When a customer enters a storage facility, such as a main office of the storage facility, the presence of the customer is sensed by one or more sensor nodes, and the remote sales agent is alerted to the customer's presence. In response, a videoconference call with the sales agent is established by the sales agent so that the customer sees an image of the sales agent and may interact with the sales agent through the videoconferencing system. After the call, the customer may further consider any rental offers, inspect the facilities, or take other actions as may be desired by the customer. During this time, the sale agent may tend to other activities, such as communicating with other customers at the same facility or other storage facilities. If the customer desires to speak with the agent again, the customer may provide a user input that automatically establishes a call with the same sales agent, if available.

Accordingly, upon entering a specific area of the facility, the customer may be immediately engaged by a remote sales agent without the customer having to perform any special steps to intentionally initiate the videoconference call. Thus, it is more likely that the customer will utilize the videoconferencing system to obtain more information on rentals, thereby increasing the likelihood that the customer will ultimately decide to rent a storage unit. In addition, by preventing the customer from having to discover how to initiate the call, potential problems and customer frustrations in contacting a sales agent can be reduced. The system can streamline the rental process and provide a rich customer experience so that the customer is more likely to want to engage with the remote sales agent and ultimately rent a storage unit.

Figure 1:
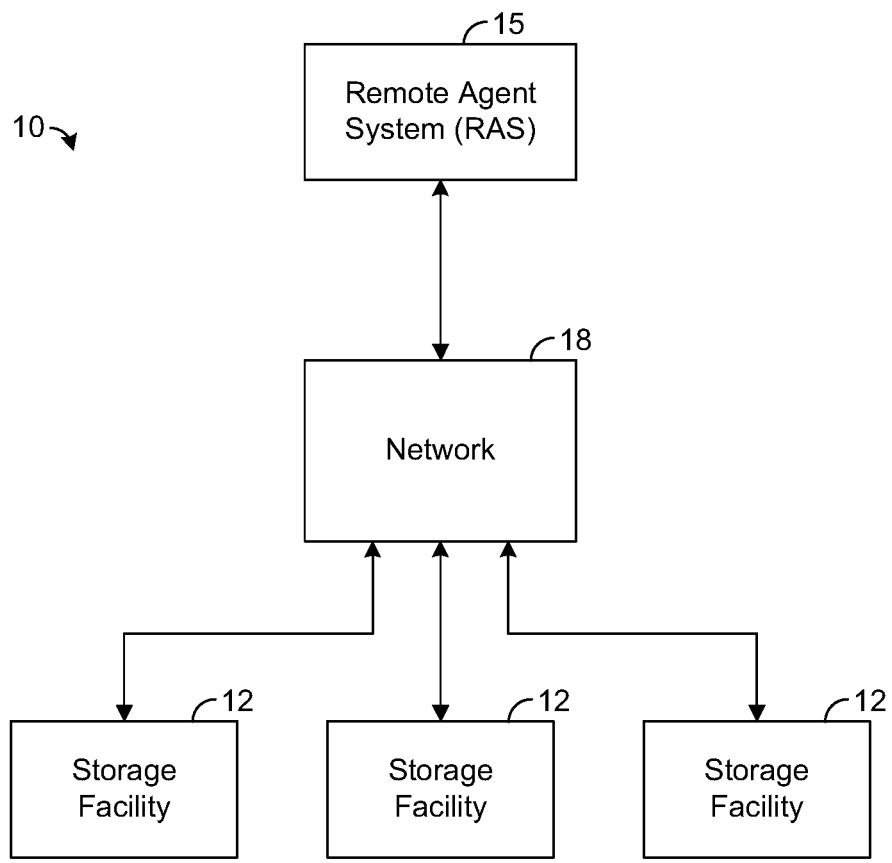
FIG. 1 is a block diagram illustrating an exemplary embodiment of a system for enabling remote management of a plurality of storage facilities.

FIG. 1 depicts an exemplary embodiment of a system 10 for enabling remote management of storage facilities. In the exemplary embodiment shown by FIG. 1, a plurality of storage facilities 12 are in communication with a remote agent system (RAS) 15 through at least one network 18. Each storage facility 12 has a plurality of storage units available for rent, purchase, or use by customers. As will be described in more detail hereafter, each storage facility 12 also has an area, such as a main office, in which customers may enter to discover information on renting, purchasing, or using the storage units and enter into a transaction for renting, purchasing, or otherwise using one or more storage units at the respective facility 12.

In this regard, the owner of the facility 12 may employ one or more sales agents to interact with customers for the purposes of providing information to the customers and assisting the customers in renting or purchasing storage units. However, rather than working on-site at the storage facility 12, a sales agent may work at the remote agent system 15, which is at a remote location relative to the storage facilities 12, and thus service customers at multiple storage facilities 12 such that the overall number of sales agents for servicing customers at all of the storage facilities 12 may be reduced.

The network 18 may comprise any number of conventional communication networks for enabling communication between the storage facilities 12 and the RAS 15. As an example, the network 18 may comprise a wide area network (WAN), such as the Internet, local area network (LAN), cellular network, or any other types of known communication networks.

Figure 2:
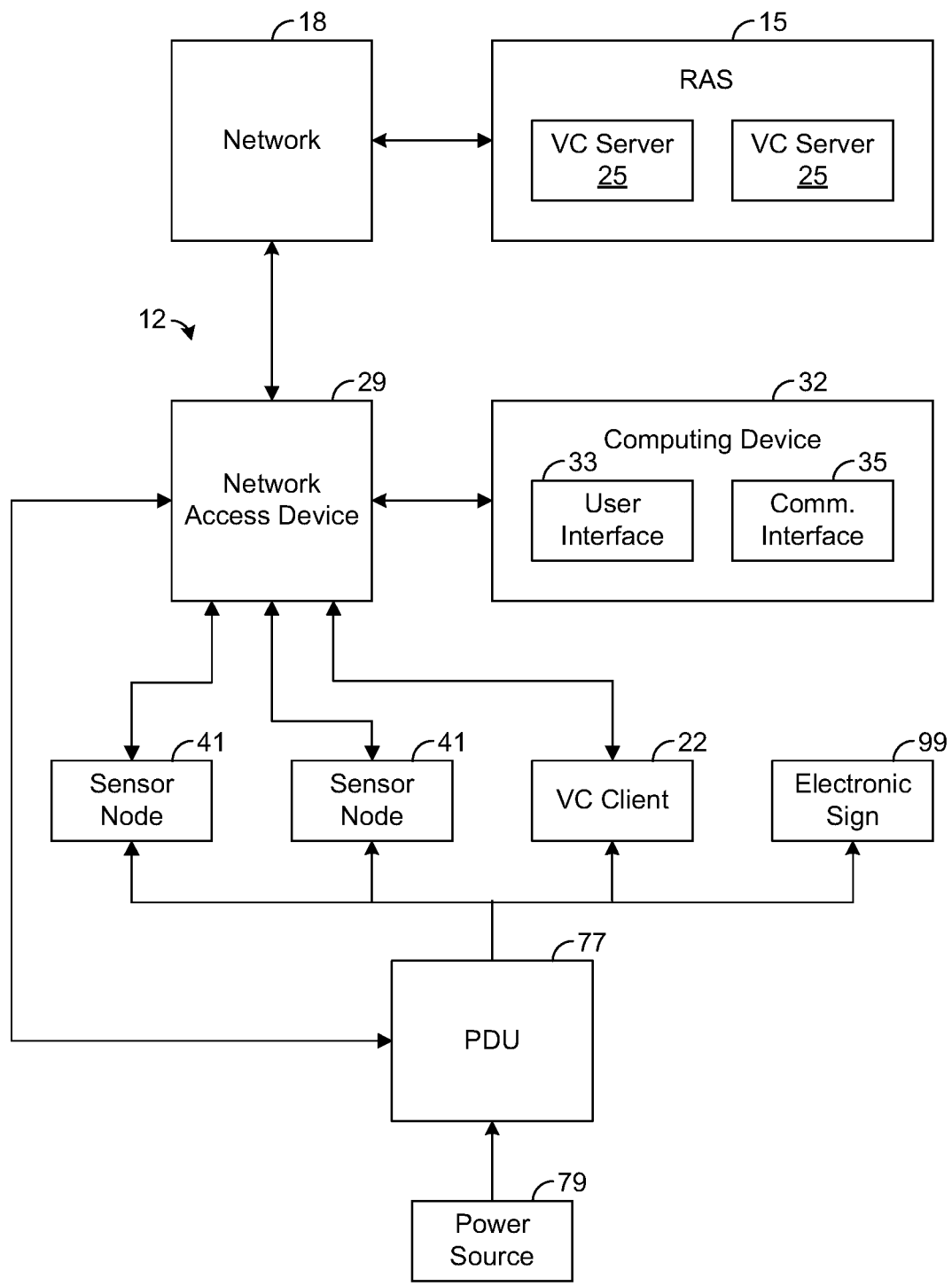
FIG. 2 is a block diagram illustrating an exemplary embodiment of a system, such as is depicted by FIG. 1, for enabling remote management of storage facilities.

FIG. 2 depicts the RAS 15 in communication with one of the storage facilities 12. The depicted storage facility 12 has a videoconferencing (VC) client 22 that may communicate with any a plurality of VC servers 25 at the RAS 15. As will be described in more detail below, a videoconference call may be established between the VC client 22 and a VC server 25 to permit a customer at the storage facility 12 to interact with (e.g., communicate) with a sales agent at the RAS 15.

As shown by FIG. 2, the storage facility 12 has a network access device 29, such as at least one modem, router, switch, or other conventional device for interfacing with the network 18. The network access device 29 may be physically coupled to any device at the storage facility 12 for enabling communication with such device via a physical medium, such as one or more wires or optical fibers. The network access device 29 may also be configured to communicate wirelessly with any device at the storage facility 12. Messages received by the network access device 29 from any device at the storage facility 12 may be encapsulated with overhead according to a protocol of the network 18 (e.g., TCP/IP or other known protocol) for communicating the message through the network to the RAS 15 or other destination.

As shown by FIG. 2, the storage facility 12 has at least one computing device 32 having a user interface 33 for receiving user inputs and providing user outputs. As an example, a customer at the storage facility 12 may use the computing device 32 to view information about the storage units at the facility 12, such as information describing the storage units and contracts pertaining to the storage units (e.g., insurance contracts, rental contracts, purchase contracts, etc.). As an example, a customer may use the computing device 32 to view a contract for renting or insuring a storage unit and provide inputs for executing or accepting the contract. Other types of information, such as advertisements for the storage units, a layout of the storage facility 12, or a location of a specific storage unit being rented, may be displayed or otherwise communicated to the customer by the computing device 32.

In some embodiments, the computing device 32 may be a mobile communications device, such as a smartphone, tablet computer, laptop computer, or other known mobile devices for communicating data and providing user outputs and receiving user inputs. In other embodiments, it is unnecessary for the computing device 32 to be mobile. As an example, the computing device 32 may be implemented with a desktop computer. In one exemplary embodiment, the computing device 32 is implemented with a tablet computer, such as an I-Pad® sold by Apple, Inc., though other types of computing devices 32 may be used in other embodiments.

The user interface 33 may have a display device (not specifically shown), such as a liquid crystal display (LCD), for displaying information to a user and at least one input device, such as a keyboard, keypad, mouse, or other types of known input devices, for receiving user inputs. In some embodiments, the input device may be integrated with the display device. As an example, the user interface 33 may comprise a touchscreen that is configured to display information and to sense touches of the screen by a user (e.g., using one or more fingers, stylus, or other objects).

As shown by FIG. 2, the computing device 32 may have a communication interface 35 that is configured to communicate with the network access device 29 (FIG. 2). As an example, the communication interface 35 may have one or more wireless transceivers for communicating wireless signals (e.g., radio frequency) using known protocols, such as Wi-Fi, Bluetooth, etc. In other embodiments, other types of signals may be used. As an example, the communication interface 35 may be coupled to the network access device 29 by a physical medium, such as one or more wires or optical fibers.

As shown by FIG. 2, the storage facility 12 also has one or more sensor nodes 41 that are used to sense customers at the storage facility 12 and/or provide information that can be used to view or otherwise monitor such customers. To sense a customer, a sensor node 41 may comprise a proximity sensor or a camera, as will be described in more detail below. When a user is sensed by a node 41, the node 41 may be configured to transmit an alert or other message to the RAS 15 so that a sales agent at the RAS 15 may be alerted to the user's presence at the facility 12. In lieu of or in addition to an alert, the sensor node 41 may provide sensed information to the RAS 15, such as a video feed of images captured by the sensor node 41. A sales agent at the RAS 15 may monitor the video feed to observe activity at the facility 12, including when a customer enters an area, such as the facility's main office. Other information may be sensed or otherwise captured by the sensor nodes 41 in other embodiments.

Figure 3:
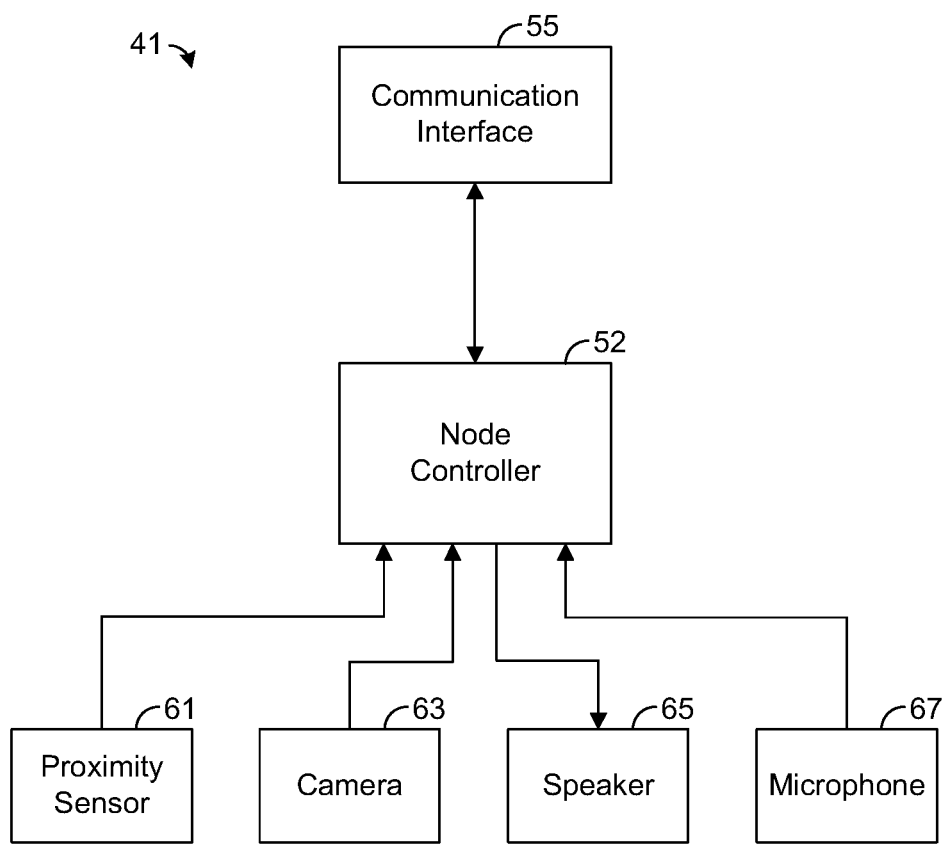
FIG. 3 is a block diagram illustrating an exemplary embodiment of a sensor node, such as is depicted by FIG. 2.

FIG. 3 depicts an exemplary embodiment of a sensor node 41. As shown by FIG. 3, the sensor node 41 comprises a controller 52, referred to herein for illustrative purposes as "node controller," for generally controlling the operation of the node 41. The node controller 52 may be implemented in hardware, software, or any combination thereof. As an example, the node controller 52 may comprise one or more processors (not specifically shown) for executing software instructions to perform the functions described herein for the node controller 52. The node controller 52 may also comprise other types of circuitry for performing the functions described herein.

As shown by FIG. 3, the node controller 52 may be coupled to a communication interface 55 that is configured to communicate with the network access device 29 (FIG. 2) and/or other devices external to the node 41. As an example, the communication interface 55 may have one or more wireless transceivers for communicating wireless signals (e.g., radio frequency) using known protocols, such as Wi-Fi, Bluetooth, etc. In other embodiments, other types of signals may be used. As an example, the communication interface 55 may be coupled to the network access device 29 by a physical medium, such as one or more wires or optical fibers.

In the exemplary embodiment shown by FIG. 3, the sensor node 41 has a proximity sensor 61, a camera 63, a speaker 65, and a microphone 67. The proximity sensor 61 is configured to detect objects within a certain range of the sensor node 41. In some embodiments, the proximity sensor 61 detects objects using infrared radiation. In this regard, the proximity sensor 61 transmits an infrared signal and detects how much infrared radiation from the signal is returned to the sensor 61. Based on the amount or profile of returned infrared radiation, the proximity sensor can detect when an object is moving within a certain range of the sensor 61. When movement is initially sensed after a predefined amount of time of no sensed movement, the node controller 52 is configured to transmit an alert message through the communication interface 55, network access device 29 (FIG. 2), and network 18 to the RAS 15. In other embodiments, other types of proximity sensors 61 and other techniques for alerting a sales agent at the RAS 15 of a presence of customer or other user at the facility 12 are possible. As an example, as will be described in more detail below, the camera 63 may be used to detect a presence of customer or other user at the facility 12.

The camera 63 is configured to capture images of an area of the facility 12, and the node controller 52 is configured to transmit such images through the communication interface 55, network access device 29 (FIG. 2), and network 18 to the RAS 15 so that a sales agent at the RAS 15 may view the images. As an example, the camera 63 may capture a video feed that is streamed to the RAS 15 for viewing by a sales agent at the RAS 15. Note that the area viewed by the camera 63 may overlap, at least in part, with the area monitored by the proximity sensor 61, although such overlap is unnecessary in other embodiments. As an example, when a sales agent receives an alert for a detection from the proximity sensor 61, the sales agent may view the video images captured by the camera 63 to observe the object sensed by the proximity sensor 61, such as when a new customer enters the area being monitored.

In some embodiments, images from the camera 63 are used to detect the presence of a customer or other users for the purpose of sending an alert to the RAS 15, thereby obviating the need of having a proximity sensor 61 (though use of both a proximity sensors 61 and a camera for detecting users and sending alerts is possible to provide redundancy and, hence, increased robustness). In this regard, the node controller 52 may be configured to compare different frames of the video feed to determine when an object within the field of view of the camera 63 has sufficiently moved to indicate that a presence of a moving user is likely. Techniques for performing image comparisons for the purpose of detecting motion are generally well known and may be used by the node 41 to determine when to send an alert message to the RAS 15.

The speaker 65 is configured to convert audio signals into sound that is output from the speaker 65. As an example, a sales agent at the RAS 15 may send a verbal message that is output by the speaker 65 to a customer or other use in the vicinity of the sensor node 41. The microphone 67 is configured to convert sound into audio signals. As an example, a verbal message by a customer or other user in the vicinity of the sensor node 41 may be captured by the microphone 67 and transmitted to the RAS 15 so that the verbal message may be heard by a sales agent at the RAS 15. Thus, via the speaker 65 and microphone 67, a sales agent at the RAS 15 may converse with a customer near the node 41.

Referring again to FIG. 2, the storage facility 12 may have a power distribution unit (PDU) 77 that is coupled to a power source 79, which is configured to provide at least one power signal to the PDU 77. As an example, the power source 79 may be an electrical outlet (e.g., wall outlet) for providing electrical power from a power network or gird, though other types of power sources, such as batteries or generators, may be used. As shown by FIG. 2, the PDU 77 may also be coupled to one or more devices at the facility 12 for delivering electrical power to such devices based on the power signal from the power source 77.

Figure 4:
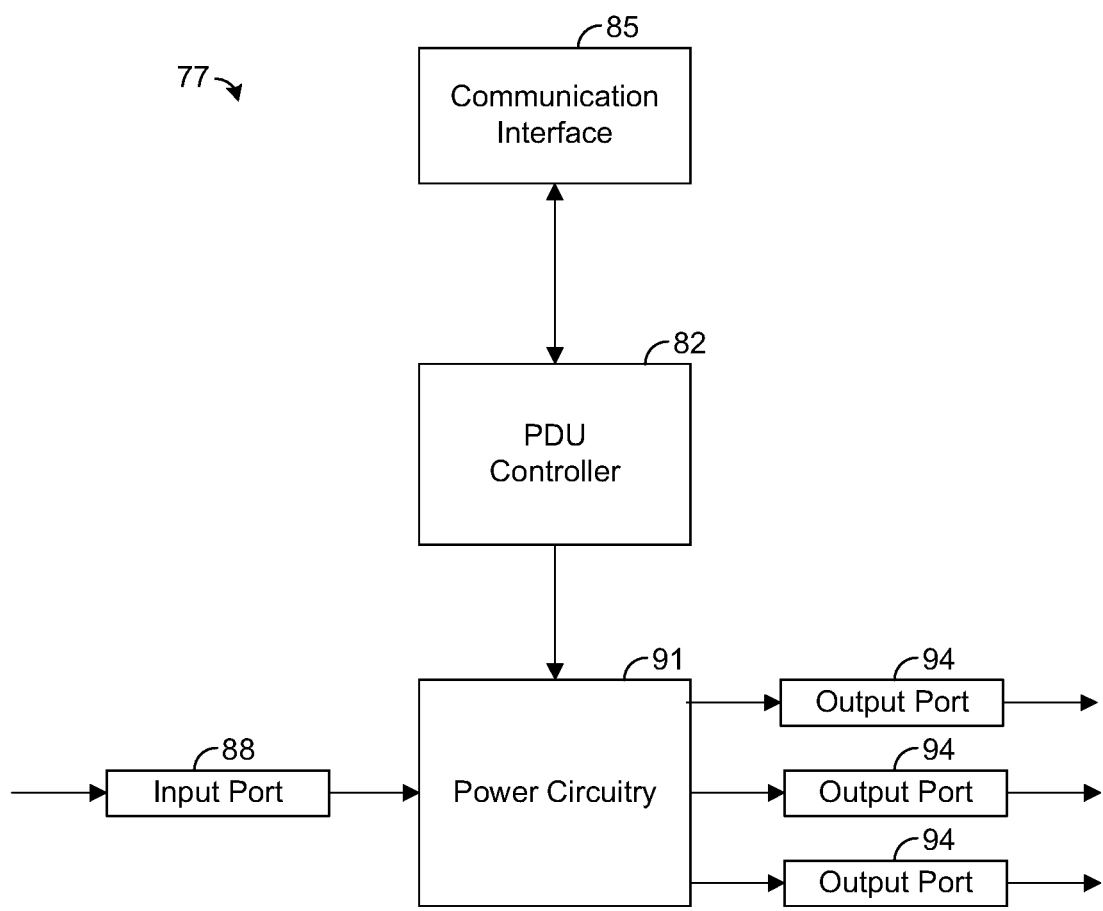
FIG. 4 is a block diagram illustrating an exemplary embodiment of a power distribution unit (PDU), such as is depicted by FIG. 2.

FIG. 4 depicts an exemplary embodiment of the PDU 77. As shown by FIG. 4, the PDU 77 comprises a controller 82, referred to herein for illustrative purposes as "PDU controller," for generally controlling the operation of the PDU 77. The PDU controller 82 may be implemented in hardware, software, or any combination thereof. As an example, the PDU controller 82 may comprise one or more processors (not specifically shown) for executing software instructions to perform the functions described herein for the PDU controller 82. The PDU controller 82 may also comprise other types of circuitry for performing the functions described herein.

As shown by FIG. 4, the PDU controller 82 may be coupled to a communication interface 85 that is configured to communicate with the network access device 29 (FIG. 2) and/or other devices external to the PDU 77. As an example, the communication interface 85 may have one or more wireless transceivers for communicating wireless signals (e.g., radio frequency) using known protocols, such as Wi-Fi, Bluetooth, etc. In other embodiments, other types of signals may be used. As an example, the communication interface 85 may be coupled to the network access device 29 by a physical medium, such as one or more wires or optical fibers.

The PDU 77 has an input port 88 that is coupled to the power source 79 (FIG. 1) for receiving an analog power signal from the power source 79. Such power signal is processed by power circuitry 91 that divides or otherwise processes power from the received power signal to deliver a plurality of power signals via output ports 94. Each output port 94 may be coupled to a respective device at the facility 12 to provide an analog power signal to the device for powering components of the device as may be desired. As an example, each of the VC client 22, sensor nodes 41, and at least one electronic sign 99 may be coupled to a respective output port 94 and receive electrical power from such port 94. In other embodiments, other devices at the facility 12, such as the computing device 32, for example, may be coupled to and receive power from the PDU 77.

Note that the power circuitry 91 may condition or process the power signal from the input port 88 in various ways. As an example, the power circuitry 91 may control (e.g., regulate) the voltage and current of the power signals output by the ports 94, and the power circuitry 91 may operate under the control of the PDU controller 82 to selectively cutoff power to any output port 94 as may be desired. Such a feature may be beneficial for the purpose of forcing a reboot of a device having an operational problem. As an example, if a sales agent at the RAS 15 suspects that a device (e.g., VC client 22, a sensor node 41, or other device) coupled to the PDU 77 is experiencing an operational problem, the sales agent may send to the PDU 77 through the network 18 a command instructing the PDU 77 to cycle the port 94 to which the device having the operational problem is coupled. In response, the PDU controller 82 may control the power circuitry 91 such that power to the identified port 94 is temporarily cutoff. Thus, the port 94 temporarily stops transmitting a power signal to the device having the operational problem. When the power signal is again provided to the device, such device may be configured to initiate a power up process including a booting routine. Rebooting of the device in this manner may correct the operational problem so that the device begins to operate normally again, thereby correcting or otherwise addressing the operational problem. Note that power cycling a port 94 in this manner may be performed for other reasons. As an example, power to a port 94 may be controlled to turn off the device coupled to the port 94, such as when the main office is closed to customers.

As an example, the electronic sign 99 may be configured to display a message indicating whether the main office at the storage facility 12 is open so that customers may enter the facility 12. As an example, the electronic sign 99, when operating, may light up or otherwise display the word "Open" to indicate that the main office is currently open for business with customers or the word "Closed" to indicate that the main office is currently closed for business with customers. Other messages may be displayed or otherwise communicated (e.g., audio messages) in other embodiments.

For illustrative purposes, assume that the electronic sign 99 displays the word "Open." When a sales agent is available at the RAS 15 for assisting and interacting with customers at the facility 12 (e.g., during normal working hours), the sales agent may use a VC server 25 or other device at the RAS 15 to transmit a command through the network 18 to the PDU 77 for instructing the PDU 77 to provide power to the output port 94 coupled to the sign 99. In response, the PDU controller 82 controls the power circuitry 91 such that a power signal is transmitted through the port 94 to the sign 99, which uses power from such signal to electronically display the message "Open."

However, when a sales agent is no longer available to assist and interact with customers at the facility 12 (such as at the end of normal business hours or during a lunch break), the sales agent may transmit a command through the network 18 to the PDU 77 for instructing the PDU 77 to stop providing power to the output port 94 coupled to the sign 99. In response, the PDU controller 82 controls the power circuitry 91 such that the power signal is no longer transmitted through the port 94 to the sign 99. Since the sign 99 is no longer receiving power from the PDU 77, it stops displaying the "Open" message. Thus, whether the sign 99 displays the "Open" message is effectively controlled by whether the PDU 77 provides power to the sign 99.

Note that, in other embodiments, the RAS controller 163 (FIG. 6) or other device at the RAS 15 may be configured to automatically send commands to the PDU 77 for controlling the electronic sign 99. As an example, the PDU 77 may be controlled to automatically turn the sign on and off at certain times of the day (e.g., keep the sign on during normal business hours and off outside of normal business hours).

Note that there are other techniques that may be used to control signage at the facility 12. As an example, a "smart" sign having a controller that is configured to communicate with the RAS 15 through the network access device 29 and network 18 may be used. In such a case, a sales agent at the RAS 15 may remotely control whether the sign displays a message and may also control the content of the message. As an example, the sales agent may enter or otherwise provide the content to be displayed. However, such a "smart" sign may be more expensive than a sign that displays the same message depending on whether it is receiving electrical power. Moreover, the use of a PDU 77 to control whether an electronic sign 99 displays content based on whether the PDU 77 is transmitting an electrical power signal to the sign 99 provides a convenient and inexpensive way for a sales agent to control the sign 99 from the RAS 15.

Figure 5:
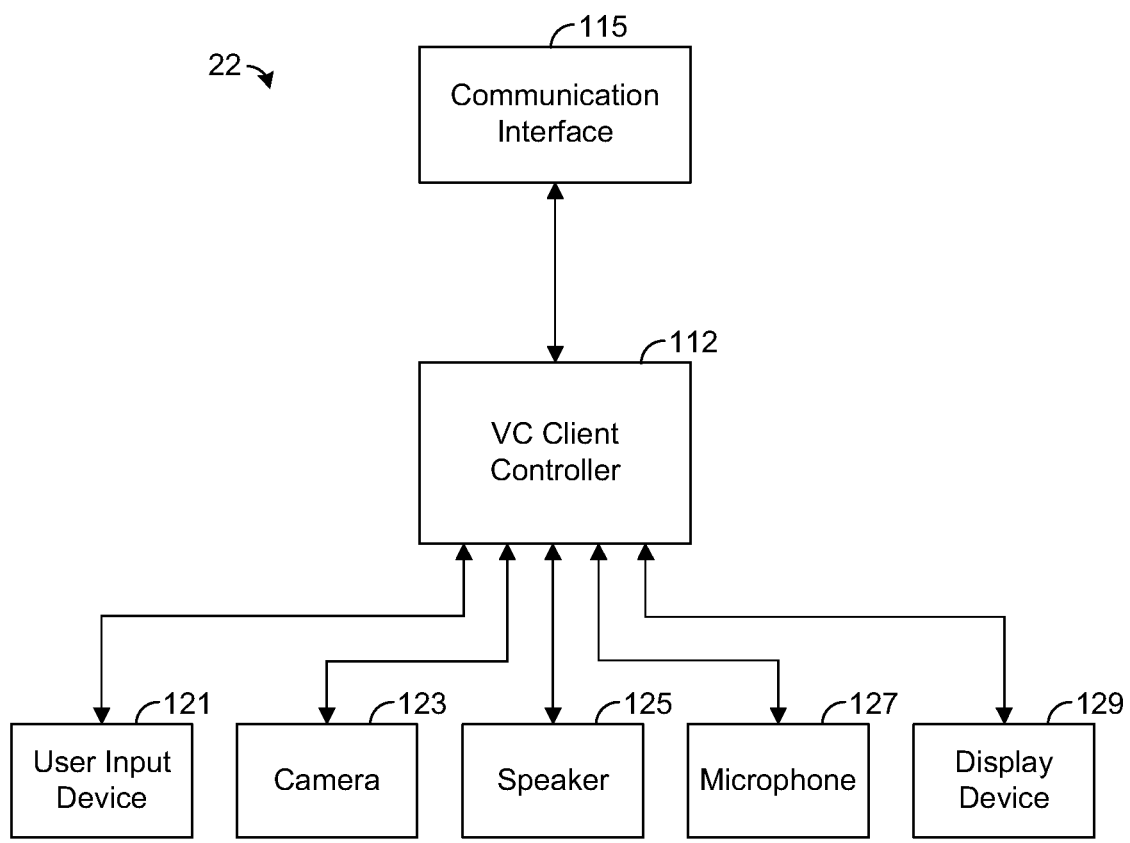
FIG. 5 is a block diagram illustrating an exemplary embodiment of a videoconferencing (VC) client, such as is depicted by FIG. 2.

FIG. 5 depicts an exemplary embodiment of the VC client 22. As noted above, a videoconference call may be established between the VC client 22 at a storage facility 12 and a VC server 25 at the RAS 15 to provide a video conferencing session between a customer or other user at the storage facility 12 and a sales agent or other user at the RAS 15. As shown by FIG. 5, the VC client 22 comprises a controller 112, referred to herein for illustrative purposes as "VC client controller," for generally controlling the operation of the VC client 22. The VC client controller 112 may be implemented in hardware, software, or any combination thereof. As an example, the VC client controller 112 may comprise one or more processors (not specifically shown) for executing software instructions to perform the functions described herein for the VC client controller 112. For example, the VC client controller 112 may be implemented with a computing device, such as smartphone, a tablet computer, a laptop computer, or a desktop computer. The VC client controller 112 may also comprise other types of circuitry for performing the functions described herein.

As shown by FIG. 5, the VC client controller 112 may be coupled to a communication interface 115 that is configured to communicate with the network access device 29 (FIG. 2) and/or other devices external to the VC client 22. As an example, the communication interface 115 may have one or more wireless transceivers for communicating wireless signals (e.g., radio frequency) using known protocols, such as Wi-Fi, Bluetooth, etc. In other embodiments, other types of signals may be used. As an example, the communication interface 115 may be coupled to the network access device 29 by a physical medium, such as one or more wires or optical fibers.

In the exemplary embodiment shown by FIG. 5, the VC client 22 has a user input device 121, a camera 123, a speaker 125, a microphone 127, and a display device 129. The camera 123 is configured to capture images of an area of the facility 12, such as the customer or other user involved in a video conferencing session. For example, the camera 123 may be positioned so that a customer standing or otherwise positioned in front of the display device 129 is within the field of view of the camera 123.

The VC client controller 112 may be configured to transmit the images captured by the camera 123 through the communication interface 115, network access device 29 (FIG. 2), and network 18 to the RAS 15 so that a sales agent at the RAS 15 may view the images. As an example, when a customer is standing or otherwise positioned (e.g., sitting) in front of the display device 129 to view the images displayed by the device 129, the camera 123 may capture a video feed depicting the customer, and this video feed may be streamed to the RAS 15 for viewing by a sales agent at the RAS 15. Note that, as described in more detail below, the VC client 22 may be positioned in the main office so that a customer may be viewed by the camera 123 near the entrance of the main office before the customer has approached the display device 129 for the videoconferencing session or even before the customer realizes that a videoconferencing session has been initiated.

Note that the camera 123 may be used to detect a presence of a customer or other user within the field of view of the camera 123 for the purpose of sending an alert message to the RAS 15, as described above for sensor nodes 41. In this regard, the VC client controller 112 may be configured to receive frames of a video feed from the camera 123 and to compare frames of the video feed to detect when there is sufficient motion to indicate a likely presence of a customer or other user. In response to such detection, the VC client controller 112 may attempt to initiate a video conference call with a VC server 25 according to techniques described herein. In other embodiments, the VC client controller 112 may transmit an alert message to the VC server 25 or one of the computing devices 190 at the workstation 156 associated with the facility 12, as will be described in more detail below, so that a sales agent at such workstation 156 may be alerted to the presence of the customer or other user.

As used herein, an "alert message" refers to a message that is transmitted in response to a detection of a user (e.g., detected motion) that triggers a specialized alert (e.g., audible or visual) at the RAS 15 for alerting a sales agent or other user at the RAS 15 to the user detection that triggered the alert message. As an example, the alert may be a series of audible beeps, an audible or visual messages, flashes on a display, or other changes to a display. In response to such alert, the sales agent may decide one or more actions, such as whether and when to initiate a video conference call to interact with the customer or other user. In such an embodiment, use of the sensor nodes 41 is unnecessary to alert the sales agent of a customer's presence. However, is possible for alerts to be sent by the VC client 22 as well as one or more sensor nodes 41 to provide redundancy and thus enhanced resiliency and robustness.

System resiliency and robustness is particularly enhanced when the VC client 22 utilizes a different communication platform than the sensor nodes 41. As an example and as described further below, a sensor node 41 may be paired with a computing device 190 (FIG. 6) using IP addressing and/or other types of information so that the sensor node 41 can communicate with the paired computing device 190 as long as the sensor node 41 can reach the Internet. Further, the communication interface 55 (FIG. 3) of the sensor node 41 may have a cellular transceiver that enables the sensor node 41 to access the Internet through a cellular network even if sensor node 41 is unable to communicate with the network access device 29 for any reason. Thus, even if the VC client 22 is unable to communicate with the RAS 15, if the user detection functionality of the VC client 22 is not working properly, or if there is some other operational problem limiting the functionality of the VC client 22, a sales agent at the RAS 15 may nevertheless be alerted to a new customer entering the facility 12 by a sensor node 41. The sales agent may also communicate with the customer through the sensor node 41, even if this form of the communication is not as rich as that provided by the VC client 22 (e.g., the customer is unable to see an image of the sales agent or the quality of the sound emitted by the sensor node 41 is not as high as the VC client 22). Such an architecture enables expensive audio/video equipment to be used for the VC client 22 for normal operation and less expensive sensor nodes 41 to provide added or redundant functionality, such as to provide a life-line to a customer in the event of a system failure with the VC client 22 or other components, such as the network access device 29.

The speaker 125 of FIG. 5 is configured to convert audio signals into sound that is output from the speaker 125. As an example, during the video conferencing session, a sales agent or other user at the RAS 15 may send a verbal message that is output by the speaker 125 to the customer or other user at the facility 12 in the video conferencing session. The microphone 127 is configured to convert sound into audio signals. As an example, a verbal message by the customer or other user in the video conferencing session at the facility 12 may be captured by the microphone 127 and transmitted to the RAS 15 so that the verbal message may be heard by a sales agent at the RAS 15.

In addition, the display device 129 may be used to render a video stream captured by a camera (not shown in FIG. 5) at the RAS 15. As an example, an image of the sales agent in the video conferencing session may be displayed by the display device 129. Thus, via the speaker 125, microphone 127, and display device 129, a sales agent at the RAS 15 may converse with the customer or other user at the facility 12 in the video conferencing session where the customer is able to see the sales agent with whom he or she is speaking.

The user input device 121 is configured to receive user inputs from a user of the VC client 22. As an example, the user input device 121 may be a keyboard, keypad, mouse, or other device conventionally used to receive user inputs. In some embodiments, the user input device 121 may be utilized to establish a video conference call with a VC server 25. As an example, the user input device 121 may comprise a button or other type of switch that when activated by a user provides an input that causes the VC client controller 112 to establish a video conference call with a VC server 25, as will be described in more detail below. In some embodiments, the VC client controller 112 may store sufficient information, such as Internet protocol (IP) addresses, call numbers, or other information that may be used to establish a videoconference call, and this information may be used by the VC client controller 112 to initiate such a call. In other embodiments, other techniques for establishing video conference calls may be used.

Figure 6:
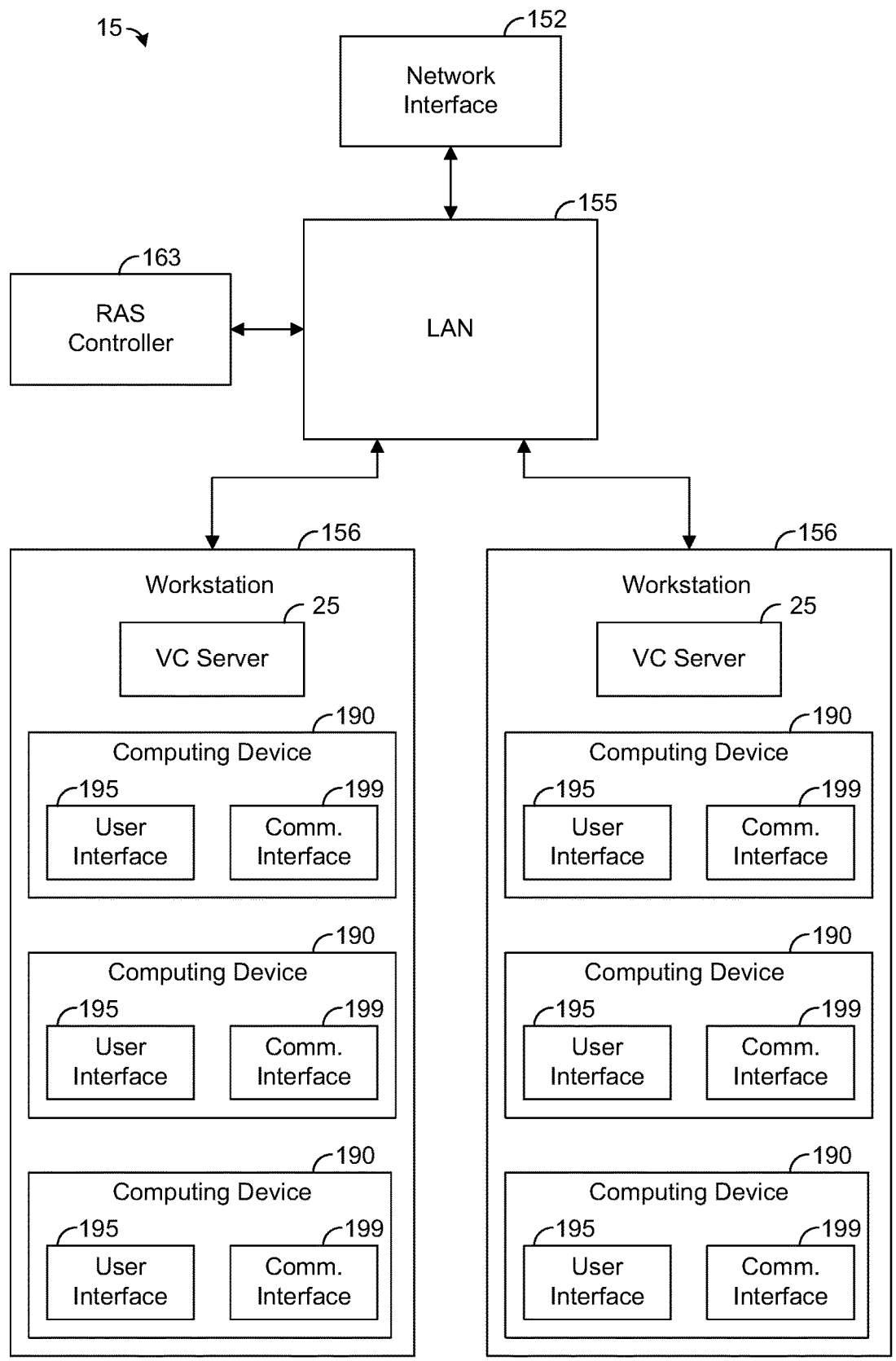
FIG. 6 is a block diagram illustrating an exemplary embodiment of a remote agent system (RAS), such as is depicted by FIG. 2.

FIG. 6 depicts an exemplary embodiment of the RAS 15. The RAS 15 depicted by FIG. 6 has a network interface 152, such as one or more modems, routers, or switches, configured to communicate with the network 18 (FIG. 2). The exemplary RAS 15 also has a LAN 155 that can be used for communication among devices at the RAS 15. As shown by FIG. 6, the RAS 15 has a plurality of workstations 156 that sales agents may use to remotely manage storage facilities 12, as described herein. As will be described in more detail below, each workstation 156 has at least one VC server 25 and a plurality of computing devices 190. Each VC server 25 may be used to establish videoconferencing sessions with the VC clients 22 (FIG. 2) at various storage facilities 12. In this regard, a videoconferencing session may be established between any VC server 25 and any VC client 22. The RAS 15 also has a RAS controller 163, which will be described in more detail below.

Figure 7:
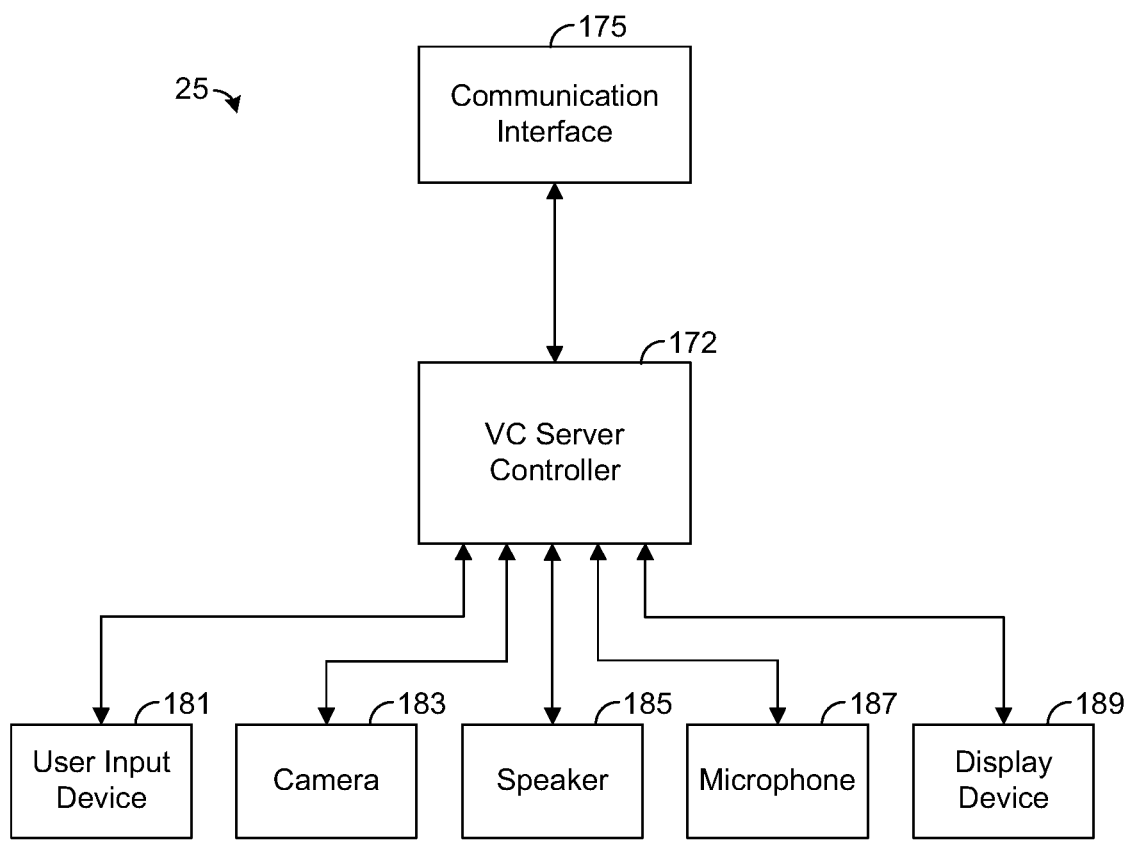
FIG. 7 is a block diagram illustrating an exemplary embodiment of a VC server, such as is depicted by FIG. 2.

FIG. 7 depicts an exemplary embodiment of a VC server 25. As noted above, a videoconference call may be established between the VC server 25 and a VC client 22 to provide a video conferencing session between a customer or other user at the VC client 22 and a sales agent or other user at the VC server 25. As shown by FIG. 7, the VC server 25 comprises a controller 172, referred to herein for illustrative purposes as "VC server controller," for generally controlling the operation of the VC server 25. The VC server controller 172 may be implemented in hardware, software, or any combination thereof. As an example, the VC server controller 172 may comprise one or more processors (not specifically shown) for executing software instructions to perform the functions described herein for the VC server controller 172. For example, the VC server controller 172 may be implemented with a computing device, such as smartphone, a tablet computer, a laptop computer, or a desktop computer. The VC server controller 172 may also comprise other types of circuitry for performing the functions described herein.

As shown by FIG. 7, the VC server controller 172 may be coupled to a communication interface 175 that is configured to communicate with the LAN 155 (FIG. 6), such as transmitting messages through the LAN 155, network interface 152 and network 18 (FIG. 2) to a storage facility 12 or receiving messages from a storage facility 12. As an example, the communication interface 175 may have one or more wireless transceivers for communicating wireless signals (e.g., radio frequency) using known protocols, such as Wi-Fi, Bluetooth, etc. In other embodiments, other types of signals may be used. As an example, the communication interface 175 may be coupled to the LAN 155 or other system component by a physical medium, such as one or more wires or optical fibers.

In the exemplary embodiment shown by FIG. 7, the VC server 25 has a user input device 181, a camera 183, a speaker 185, a microphone 187, and a display device 189. The camera 183 is configured to capture images of an area of the RAS 15, such as the sales agent or other user involved in a video conferencing session. For example, the camera 183 may be positioned so that a sales agent standing or otherwise positioned in front of the display device 189 is within the field of view of the camera 183. The VC server controller 172 may be configured to transmit the images captured by the camera 183 through the communication interface 175, LAN 155 (FIG. 6), network interface 152, and network 18 (FIG. 2) to a VC client 22 at a storage facility 12 so that a customer or other user at the facility 12 may view the images. As an example, when a sales agent is standing or otherwise positioned in front of the display device 189 to view the images displayed by the device 189, the camera 183 may capture a video feed depicting the sales agent, and this video feed may be streamed to the VC client 22 at the storage facility 12 for viewing by a customer or other user at the facility 12.

The speaker 185 is configured to convert audio signals into sound that is output from the speaker 185. As an example, during the video conferencing session, a customer or other user at the VC client 22 may send a verbal message that is output by the speaker 185 to the sales agent or other user at the RAS 15 in the video conferencing session. The microphone 187 is configured to convert sound into audio signals. As an example, a verbal message by the sales agent or other user in the video conferencing session at the VC server 25 may be captured by the microphone 187 and transmitted to the VC client 22 at the storage facility 12 so that the verbal message may be heard by a customer or other user at the facility 12. In addition, the display device 189 may be used to render a video stream captured by the camera 123 (FIG. 5) at the VC client 22. As an example, an image of the customer or other user at the storage facility 12 in the video conferencing session may be displayed by the display device 189. Thus, via the speaker 185, microphone 187, and display device 189, a sales agent at the RAS 15 may converse with the customer or other user at the facility 12 in the video conferencing session where the sales agent is able to see the customer with whom he or she is speaking.

The user input device 181 is configured to receive user inputs from the user of the VC server 25. As an example, the user input device 181 may be a keyboard, keypad, mouse, or other device conventionally used to receive user inputs. In some embodiments, the user input device 181 may be utilized to establish a video conference call with a VC client 22. As an example, upon recognizing that a new customer has entered a particular facility 12 or that a customer at the facility needs assistance, a sales agent may use the device 181 to provide inputs for selecting or otherwise identifying the VC client 22 to be called. In some embodiments, the VC server controller 172 may store sufficient information, such as Internet protocol (IP) addresses, call numbers, or other information that may be used to establish a videoconference call, and this information may be used by the VC server controller 172 to initiate such a call. In other embodiments, other techniques for establishing video conference calls may be used.

As shown by FIG. 6, the RAS 15 has a plurality of computing devices 190. Each computing device 190 has a user interface 195 for receiving user inputs and providing user outputs. In some embodiments, each of the computing devices 190 may be a mobile communications device, such as a smartphone, tablet computer, laptop computer, or other known mobile devices for providing user outputs and receiving user inputs. In other embodiments, it is unnecessary for the computing devices 190 to be mobile. As an example, a computing device 190 may be implemented with a desktop computer. In one exemplary embodiment, each computing device 190 is implemented with a tablet computer, such as an I-Pad® sold by Apple, Inc., though other types of computing devices 190 may be used in other embodiments.

The user interface 195 may have a display device (not specifically shown), such as a liquid crystal display (LCD), for displaying information to a user and at least one input device, such as a keyboard, keypad, mouse, or other types of known input devices, for receiving user inputs. In some embodiments, the input device may be integrated with the display device. As an example, the user interface 195 may comprise a touchscreen that is configured to display information and to sense touches of the screen by a user (e.g., using one or more fingers, stylus, or other objects).

As shown by FIG. 6, each computing device 32 may have a communication interface 199 that is configured to communicate with the LAN 155, such as transmitting messages through the LAN 155, network interface 152 and network 18 (FIG. 2) to a storage facility 12 or receiving messages from a storage facility 12. As an example, the communication interface 199 may have one or more wireless transceivers for communicating wireless signals (e.g., radio frequency) using known protocols, such as Wi-Fi, Bluetooth, etc. In other embodiments, other types of signals may be used. As an example, the communication interface 199 may be coupled to the LAN 155 or other system component by a physical medium, such as one or more wires or optical fibers.

In some embodiments, each sale agent at the RAS 15 is associated with a respective VC server 25 and a plurality of computing devices 190. As an example, a sales agent may be positioned at a respective workstation 156 where he or she has access to and can view the output from the agent's associated VC server 25 and computing devices 190. As will be described in more detail below, the agent's VC server 25 may be used to interact with a customer at any facility 12 in a videoconference call. Further, the agent's associated computing devices 190 may be used to obtain information from a plurality of storage facilities 12 for which the agent is responsible for monitoring. In some embodiments, the display devices of the VC server 25 and all of the computing devices 190 of the same workstation 156 are simultaneously viewable from the same location. Thus, a sales agent for the workstation 156 at such location may selectively view any such display device without having to move to a new location, thereby assisting the sales agent in monitoring of activities at the associated storage facilities 12 for the workstation 156.

In this regard, for some embodiments, a given sales agent may be assigned a plurality of storage facilities 12 for which the agent is responsible for monitoring. By monitoring the same facilities 12 over time, the agent can become familiar with the storage facilities 12 assigned to him or her and thus be able to assist customers at those facilities better, such as better answering their questions about these facilities 12 or directing customers to resources available at such facilities 12.

Each computing device 190 is configured to communicate with one or more sensor nodes 41 (FIG. 2) at a respective facility 12. In this regard, in some embodiments, each computing device 190 is associated with a specific storage facility 12 and is configured to display or otherwise output information (e.g., camera feeds) from the sensor nodes 41 at that facility 12. As an example, the sensor nodes 41 at a given facility 12 may be provisioned with one or more addresses of the computing device 190 associated with such facility 12 so that they communicate with and are controlled by the associated computing device 190. That is, a sensor node 41 at a facility associated with a particular computing device 190 may be paired with that computing device 190 such that information from such node 41 is transmitted to the computing device 190.

Note that there are various techniques that can be used to pair a sensor node 41 with a computing device 190 at the RAS 15. In one embodiment, the pairing is performed such that the computing device 190 and the sensor node 41 can communicate over the Internet. In this regard, during a pairing process prior to normal operation, the computing device 190 may be moved to a close proximity of the sensor node 41 so that the computing device 190 and sensor node 41 may communicate using a short-range wireless protocol, such as Bluetooth, for example. After establishing communication, the computing device 190 and sensor node 41 may exchange IP addresses and/or other information that enables communication over the Internet and/or other networks. After pairing, the computing device 190 may be moved to the RAS 15, and the computing device 190 and the sensor node 41 may communicate using the information exchanged during the pairing process. In other embodiments, other techniques for pairing the sensor node 41 with a computing device 190 are possible.

Thus, the computing device 190 associated with a given facility 12 may display a video stream captured by the camera 63 (FIG. 3) of a sensor node 41 at such facility 12. At any given time, a sales agent may view the user interface 195 of such computing device 190 at the RAS 15 to see the scene at the associated storage facility 12 captured by a sensor node 41. Moreover, over time, the sales agent may view or otherwise monitor the computing devices 190 at his or her workstation 156 to check the status of any of the storage facilities 12 for which he or she is responsible for monitoring.

As an example, to determine whether a customer is in the main office of a certain storage facility 12, the sales agent may find the computing device 190 that is associated with that facility 12 and simply view the user interface 195 of this computing device 190. The sales agent may continue to view the customer with such computing device 190 to observe the behavior of the customer. If the sales agent, based on such observations, determines that the customer appears to need assistance, the sales agent may initiate a video conference call with the VC client 22 (FIG. 2) at the same facility 12 using the VC server 25 at his or her workstation 156 in an effort to communicate with and assist the customer.

Note that multiple agents may be assigned the responsibility of monitoring the same or different storage facilities 12. Moreover, monitoring responsibilities may be distributed in any manner as may be desired.

Figure 8:
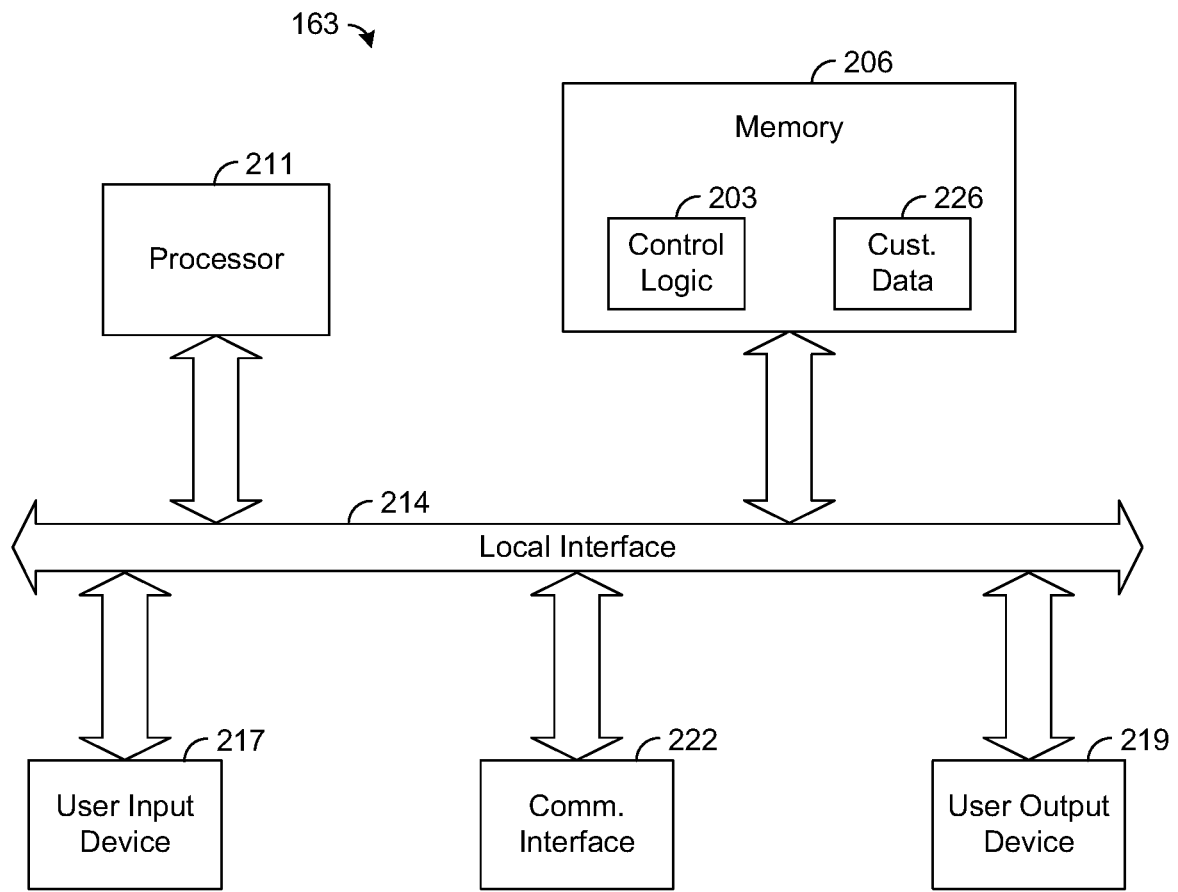
FIG. 8 is a block diagram illustrating an exemplary embodiment of a RAS controller, such as is depicted by FIG. 6.

FIG. 8 depicts an exemplary embodiment of the RAS controller 163. As shown by FIG. 8, the RAS controller 163 comprises control logic 203 for generally controlling the operation of the RAS controller 163, as will be described in more detail hereafter. The control logic 203 can be implemented in software, hardware, or any combination thereof. In the exemplary RAS controller 163 illustrated by FIG. 8, the control logic 203 is implemented in software and stored in memory 206 of the RAS controller 163.

The exemplary RAS controller 163 depicted by FIG. 8 comprises at least one conventional processor 211, such as a digital signal processor (DSP) or a central processing unit (CPU), that communicates to and drives the other elements within the RAS controller 163 via a local interface 214, which can include at least one bus. Furthermore, a user input device 217, for example, a keyboard, keypad, mouse, or other types of known input devices can be used to input data from a user of the RAS controller 163, and a user output device 219, for example, a printer, monitor, liquid crystal display (LCD), or other display apparatus, can be used to output data to the user.

Further, a communication interface 222 is configured to communicate with the LAN 155, such as transmitting messages through the LAN 155 (FIG. 6), network interface 152 and network 18 (FIG. 2) to a storage facility 12 or receiving messages from a storage facility 12. As an example, the communication interface 222 may have one or more wireless transceivers for communicating wireless signals (e.g., radio frequency) using known protocols, such as Wi-Fi, Bluetooth, etc. In other embodiments, other types of signals may be used. As an example, the communication interface 222 may be coupled to the LAN 155 or other system component by a physical medium, such as one or more wires or optical fibers.

As shown by FIG. 8, customer data 226 may be stored in the memory 226. The customer data 226 may be associated with customers any of the storage facilities 12. As an example, when a customer applies to rent a storage unit, information from an application filled out by the user may be stored as part of the customer data 226. Such information may include information about the customer, such as his or her name, address, contact information (e.g., telephone number or email address). The customer data 226 may also indicate which storage units have been rented by the customer. In addition, the customer data 226 may indicate whether the customer has purchased insurance for any such storage units or may indicate any other information associated with the customer as may be desired.

Note that a user (e.g., a sales agent) of any VC server 25 may access and update the customer data 226 as may be desired. In this regard, the user may provide inputs via the user input device 217 to update the customer data 226 and view the customer data 226 via the user output device 219. It is also possible for a user to use any VC server 25 or other device in communication with the RAS controller 163 to access and update the customer data 226.

In addition, as noted above, any of the sensor nodes 41 (FIG. 2) may be configured to send an alert message when a customer is sensed by the node 41, such as when a customer enters the main office being monitored by the sensor node 41. As an example, a sensor node 41 may be configured to sense a presence of a new customer when it detects movement of an object (e.g., senses motion with its proximity sensor 61) after at least a predefined amount of time of sensing no motion. In response to such detection, the sensor node 41 may be configured to transmit an alert to the computing device 190 that is associated with the facility 12 in which the sensor node 41 is located.

In response to the alert message, the computing device 190 may be configured to generate an alert to the sales agent, such as outputting an audible message or cue (e.g., a series of beeps or a pre-recorded or computer-generated verbal message) or a visual message or cue. Upon hearing or otherwise receiving the alert, the sales agent may view the video feed displayed by the computing device 190 to see a video image captured by the sensor node 41.

Thus, upon receiving an alert that a new customer has been detected, the sales agent may view the user interface 195 of the computing device 190 that provided the alert to visually confirm whether a new customer has indeed entered the main office of the storage facility 12. If so, the sales agent may then use the VC sever 25 at his or her workstation 156 to initiate a video conference call with the VC client 22 at the same facility. Thus, the sales agent may communicate with the new customer through the video conference call to assist the new customer.

From the customer's perspective, upon entering the main office, a video stream of the sales agent is displayed to the customer by the VC client 22, and the customer may converse with the sales agent just as if the sales agent was actually at the storage facility 12. This functionality and customer experience occur without the customer having to take any specialized action other than simply entering the main office of the storage facility 12. In addition, the video call can be initiated and the image of the sales agent can be displayed to the customer shortly after the customer enters the main office. Accordingly, the customer is less likely to be confused or frustrated before having the opportunity to converse with the sales agent, thereby increasing the likelihood that the customer will utilize the video conferencing capabilities of the system 10 to receive assistance and feedback from the sales agent.

Note that similar techniques may be used to alert a sales agent when a customer approaches the VC client 22. In such example, a sensor node 41 may determine when the customer has entered into an area monitored by the sensor node 41 close to the VC client 22 and, in response, transmit an alert message to the computing device 190 associated with the facility 12 to cause such device 190 to emit an alarm. The sales agent (having been alerted to the presence of the customer near the VC client 22) may decide to initiate a videoconference call with the VC client 22 so that the customer does not need to provide an input for initiating a call. In other examples, the sales agent may establish a videoconference call with a customer for other reasons. In addition, as noted above, it is possible for other system components, such as the VC client 22 to detect a presence of the customer and send an alert message to the RAS 15.

In some embodiments, the VC client 22 at a given storage facility 12 is provisioned with one or more addresses of the VC server 25 of the sales agent who is responsible for monitoring that particular storage facility. Thus, if a video conference call is initiated by the VC client 22, the call is established with the VC server 25 of the agent who is responsible for the facility 12 in which the VC client 22 resides, assuming such sales agent is available. Thus, the call should go to a sales agent who is familiar with the storage facility 12 and thus can better answer the customer's questions or provide better feedback.

In addition, from a customer service perspective, it is generally desirable for the same customer to be assisted by the same sales agent over multiple calls. In this manner, the sales agent may already be familiar with the customer and the issues that the customer may be having and, therefore, be able to provide better and more efficient feedback to the customer relative to other sales agents. Provisioning the VC client 22 to initiate calls to the VC server 25 of the sales agent associated with the storage facility 12 helps to ensure that the customer will be connected to the same agent each time he or she uses the VC client 22 to initiate a videoconference call, assuming such sales agent is available. A described in more detail above, it is possible however for calls to go to different sales agents based on agent availability or other factors.

Figure 9:
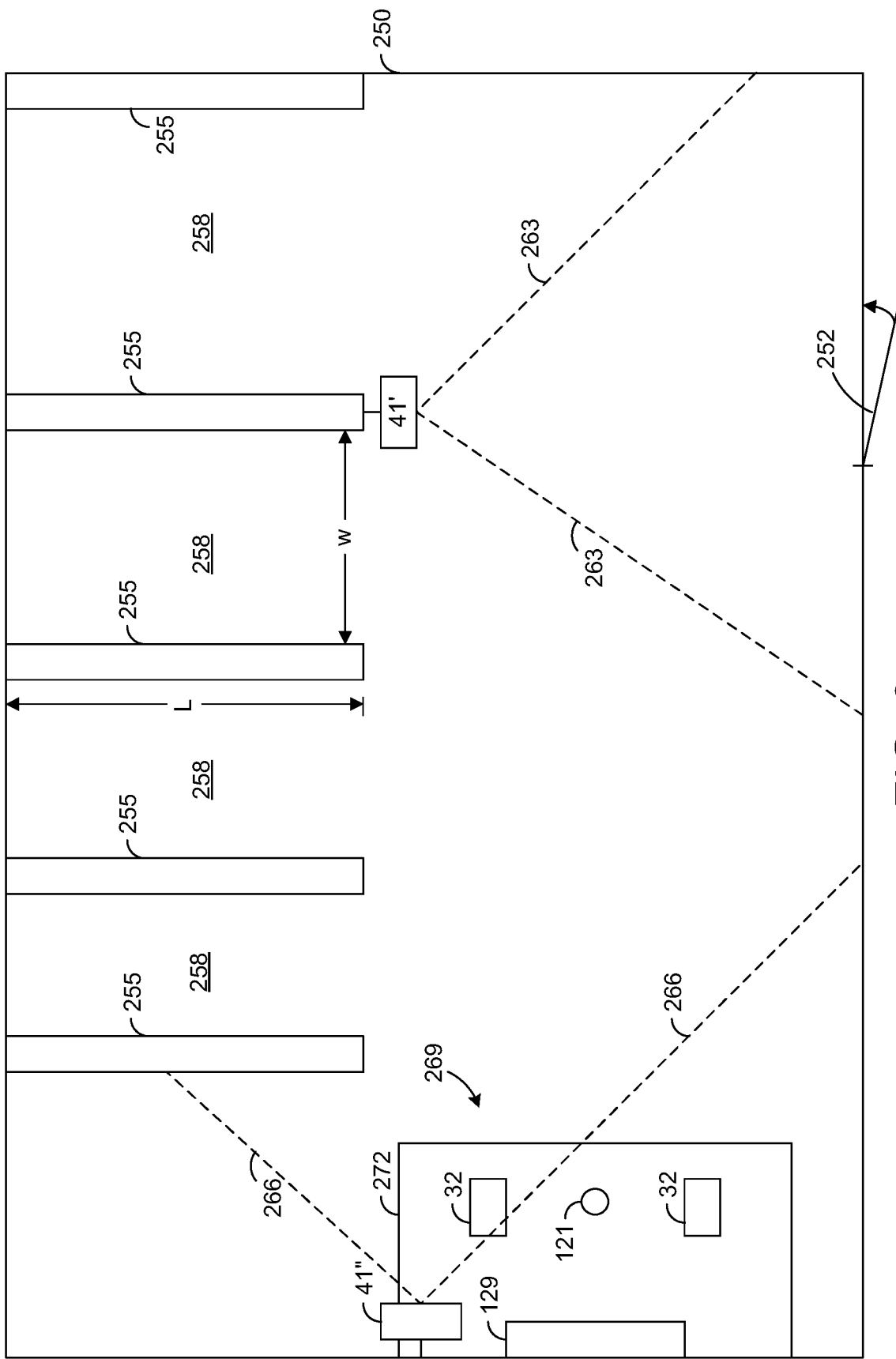
FIG. 9 is a top view of an exemplary layout for a main office of a storage facility, such as is depicted by FIG. 2.

FIG. 9 depicts an exemplary main office 250 of a storage facility 12. The main office 250 has a front door 252 through which a customer may enter the main office 250. As shown by FIG. 9, the main office 250 has a plurality of parallel walls 255 defining spaces 258 between the walls 255. The walls 255 may be sized such that each space 258 represents a sample storage unit. As an example, two walls 255 defining a respective space 258 may be separated by a width (w) that matches a width of a storage unit, and the two walls 255 may have a length (L) that matches a length of such storage unit. Thus, the space 258 defined by the two walls 255 may be the same size as the space defined by a storage unit represented by the space 258. Also, the widths of the different spaces 258 may be different such that each space 258 represents a storage unit of a different size. Thus, by viewing the spaces 258, a customer can visualize the difference between a storage unit of one size relative to a storage unit of a different size. Having the spaces 258 in the main office 250 may help a customer determine which size storage unit will best meet his or her needs.

The camera 63 (FIG. 3) of a sensor node 41' at the main office 250 may have a field of view 263 of one area of the main office 250, such as the front door 252 or other area that a customer enters, and another sensor nodes 41" at the main office 250 may have a field of view 266 of another area of the main office 250 that a user enters to approach the display device 129 of the VC client 22. Thus, the images captured by a camera 63 having the field of view 263 may be used to confirm when a new customer enters the main office 250, and the images captured by a camera 63 having the field of view 266 may be used to determine when a customer has approached the display device 129 or other components of a customer workstation, as will be described in more detail below. In some embodiments, the fields of views 263, 266 of cameras 63 of different sensor nodes 41 may overlap.

Figure 10:
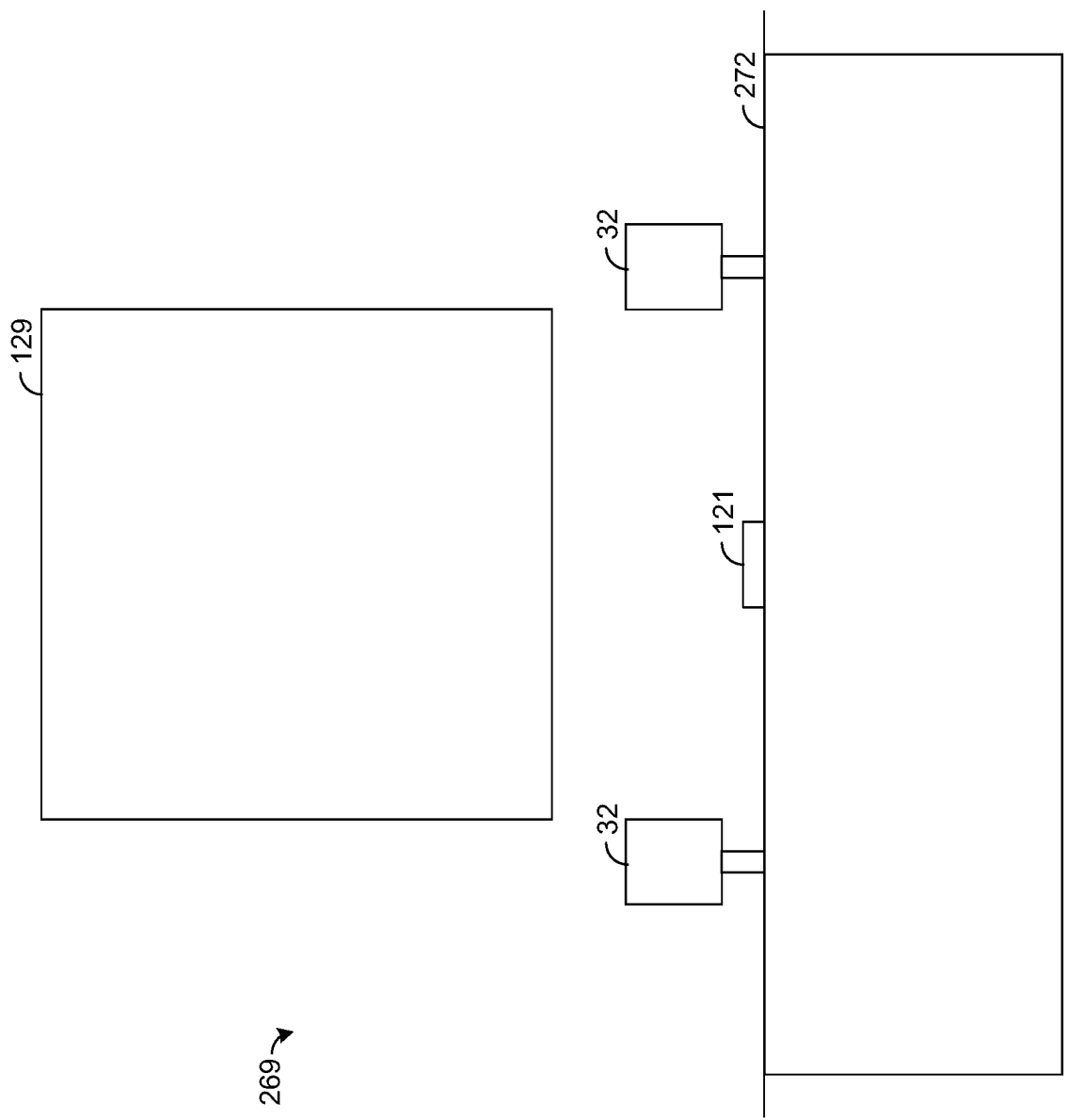
FIG. 10 depicts an exemplary embodiment of a customer workstation, such as is depicted by FIG. 9.

As shown by FIGS. 9 and 10, the main office 250 may have a customer workstation 269 that is used by a customer to interact with a sales agent at the RAS 15 (FIG. 2) and perform other actions, such as providing inputs for renting a storage unit, as will be described in more detail below. The customer workstation 269 may have a counter 272 on which various components reside, such as a user input device 121 (FIG. 5) and one more computing devices 32 (FIG. 2). In addition, a display device 129 (FIG. 5) for the VC client 22 may be mounted on a wall above the counter 269, although other locations for the foregoing components are possible in other embodiments.

The use of the sensor nodes 41', 41" to provide video surveillance of the main office 250 enables the sales agent at the RAS 15 to closely monitor the actions of the customer so that the sales agent at desired times, based on the actions or behavior of the customer, may engage the customer by initiating a vidoeconference call via the VC server 25 and the VC client 22. As an example, as described above, the sales agent can initiate a call to engage the customer shortly after the customer enters the main office 250 and the sales agent has confirmed via video images that a new customer is in fact on site.

In addition, even after the sales agent has engaged the customer via a videoconferencing session, the sales agent may continue to monitor the customer after the videoconferencing session and re-engage the customer if the sales agent sees that the customer looks confused or appears to be searching for information. Also, if the customer attempts to re-engage the sales agent by approaching the customer workstation 269, the sales agent may notice this behavior and initiate a new videoconferencing session with the customer. Thus, even if the customer is unable to determine how to initiate a call, the sales agent may notice the customer's efforts and proceed with initiating a call. Thus, using video from the sensor nodes 41', 41" helps to provide a very robust customer experience by enabling the sales agent to make better decisions about when to initiate a video conferencing session with the customer.

Further, the use of sensor nodes 41', 41" also helps the same sales agent to track activity at many storage facilities 12 even while the sales agent is engaged in a videoconference call with the VC server 25 at his or her workstation 156. In this regard, during a call, the sales agent may still use the computing devices 190 at his or her workstation 156 to view the video images captured by the sensor nodes 41 at other facilities 12.

In order to keep the overall costs low, the sensor nodes 41 may be implemented using known video surveillance systems separate from the VC conferencing system defined by the VC servers 25 and VC clients 22. As an example, in some embodiments, the sensor nodes 41 are implemented with Google Nest® camera nodes sold by Google, LLC. Moreover, it is possible to use an off-the-shelf system, like Google Nest® or other known video surveillance systems, to provide video surveillance while using high-quality video conferencing equipment for the VC clients 22 and VC servers 25. This approach helps to keep the overall costs low while the customer enjoys a rich videoconferencing experience. Indeed, the system 10 can be easily installed without having to custom-design the video surveillance functionality considering that a given computing device 190 at the RAS 15 can be paired with the sensor nodes 41 at the associated storage facility 12 using conventional initialization procedures from the manufacturer of the sensor nodes 41.

In addition, by not relying on the camera 123 (FIG. 5) of the VC client 22 for the video surveillance performed by the sensor nodes 41, better surveillance can be achieved. In particular, the sensor nodes 41 can be strategically positioned for their intended purpose irrespective of the location of the VC client 22. In addition, the number of sensor nodes 41 can be increased to provide greater video coverage at a relatively low cost. In other embodiments, a single, integrated system providing both video surveillance and videoconferencing may be used, and other types of equipment and techniques may be used to provide the video surveillance and videoconferencing described herein.

In some embodiments, the sensor nodes 41 may be used to effectively "throw" the voice of the sales agent to help customers understand whether a verbal message is intended for them. As an example, referring to FIG. 9, assume that a sales agent is engaged with a customer at the VC client 22 in a videoconference call when a new customer enters through the door 252. In such a situation, the sales agent (during the call) may use the computing device 190 at the RAS 15 associated with the facility 12 of the main office 250 to send a verbal message to the new customer who just entered through the door 252. As an example, the sales agent may explain that he or she is on a videoconference call with another customer and will be with the new customer in just a minute.

To help the new customer understand that the message is intended to him or her, the verbal message may be output by the speaker 65 (FIG. 3) of the sensor node 41' that is closest to the new customer. This not only helps the new customer understand that the message is intended for him or her, but it also does not require the customer in the call via the VC client 22 to realize that the sales agent has engaged another customer. In fact, in some embodiments, the verbal message may be pre-recorded or computer-generated so that the sales agent in the call does not even have to speak the verbal message. Alternatively, the sales agent may pause the video conference call, speak the verbal message to the new customer and then resume the video conference call without the customer in the call even realizing that the call has been paused. Yet other techniques for simultaneously engaging multiple customers are possible.

In addition, by using the sensor node 41' to engage the new customer entering the main office 250, it is unnecessary for the sales agent to attempt to get the new customer's attention through the VC client 22, which may be a greater distance away. Indeed, it may be particularly difficult to get the attention of the new customer through the VC client 22 when the VC client 22 is currently being used for a call with another customer. Using the sensor node 41' enables more efficient communication between the sales agent and the new customer. Note that there may be other times when it may be desirable for the sales agent to communicate with a customer through one of the sensor nodes 41 rather than VC client 22.

In some embodiments, a sensor node 41 may be positioned such that the display of the computing device 32 used by a customer at the workstation 269 is in the field of view of the node's camera 63 (FIG. 3). As an example, if the user interface 33 (FIG. 2) of the computing device 32 comprises a display screen, the camera 63 may be positioned such that the display screen is in the camera's field of view. For example, the sensor node 41 may be positioned on the ceiling above the computing device 32, although other locations for the sensor node 41 to achieve this effect are possible.

When the customer is using the computing device 32 to rent a storage unit or perform other action, such as purchasing insurance, for example, the sensor node 41 may transmit to the RAS 15 images of the display from the computing device 32. Such images may be displayed to the sales agent by the computing device 190 associated with the facility 12 or another device at the RAS 15. This information may help the sales agent to see what the customer is seeing on the computing device 32, thereby helping the sales agent to assist the customer as he or she uses the computing device 32. Using a sensor node 41 to provide information on the display of the computing device 32 enables the sales agent to have access to this information without requiring the computing device 32 to be configured to provide it. Thus, it is unnecessary to custom-design the computing device 32 to provide this information, thereby helping to keep the costs of the computing devices 32 low. In other embodiments, it is unnecessary for the sales agent to have access to this information or for the sales agent to obtain such information using other techniques, such as having the computing device 32 transmit it to the RAS 15.

As noted above, it may be generally desirable for the same sales agent to interact with the same customer over multiple calls. This may help the customer to become familiar with the sales agent and may also help the sales agent to better manage any issues or answer any questions that the customer may have. The system 10 may be configured to attempt to route video conference calls for the same customer to the same sales agent as much as possible or desirable based on the workloads of the sales agents. There are various techniques that can be used to help ensure this.

As an example, each workstation 156 at the RAS 15 may serve as a "primary" workstation for a respective group of storage facilities 12. Such a primary workstation 156 for a group of storage facilities 12 has a plurality of computing devices 190 respectively associated with such storage facilities 12. Thus, the sensor nodes 41 at a given storage facility 12 of this group are paired with a respective one of the computing devices 190 at the primary workstation 156. When a new customer is detected at one of these storage facilities 12, an alert is sent to the facility's primary workstation 156. Therefore, as long as the same sales agent remains at this work station 156, any alert of a new customer should first go to a computing device 190 being monitored by this sales agent. In such an embodiment, if the same customer comes to the same facility 12 multiple times, the same sales agent may receive the alerts for this customer and will have the opportunity to engage the customer as described in more detail herein.

In general, as described above, the sales agent at the primary workstation 156 for a given facility may be expected to monitor the facility 12 and engage the customers at the facility 12. However, if a sales agent at the primary workstation 156 is unavailable for any reason, then a sales agent at another workstation 156, referred to in this example as "secondary workstation," may engage a customer at the facility 12. As an example, a sales agent at the facility's primary workstation 156 may be in a videoconference call with another customer such that he or she may be unable to engage a new customer at the present time. In such case, a sales agent at the secondary workstation 156 may engage the new customer, as will be described in more detail below.

Note that there are various techniques that can be used to notify a sales agent at secondary workstation 156 to engage a new customer. As an example, when the sales agent at the primary workstation 156 for a facility 12 receives an alert of a new customer, such sales agent may use the VC server 25 at the primary workstation 156 to a send a message to the VC server 25 of another sales agent requesting this other sales agent to engage the new customer. Such message may include information identifying the facility 12 where the new customer is located, such as a telephone number or other identifier of the facility 12. In response, the sales agent at the secondary workstation 156 may use the VC server 25 at the secondary workstation 156 to initiate a video conference call with the VC client 22 at the facility 12 where the new customer is located so that the sales agent may engage the new customer in a videoconferencing session. Note that the secondary workstation 156 may be at the same premises as the primary workstation 156, or the primary and secondary workstations may be located at different locations and communicate using a WAN, for example.

In other examples, the hand-off to the sales agent at the secondary workstation 156 may be automatic so that it does not require actions by the sales agent at the primary workstation. As an example, the computing device 190 that is providing the alert for the new customer may be configured to continue providing the alert for at least a predefined amount of time. If the sales agent at the primary workstation 156 fails to provide a user input acknowledging the alert within the predefined time period, the computing device 190 may be configured transmit a message to the secondary workstation 156, as described above, so that the process of engaging the new customer is handed-off to the secondary workstation 156.

In yet another embodiment, the computing device 190 that receives a new customer alert at the primary workstation 156 may notify the VC server 25 at the primary workstation 156 of the alert, and such VC server 25 may handle handing-off of the process for engaging the new customer as described above. Note that such VC server 25 may be aware of whether the sales agent at the primary workstation 156 is available. For example, such VC server 25 may know whether the sales agent at the primary workstation 156 is currently in a videoconference call. Also, the sales agent at the primary workstation 156 may provide a user input indicating whether he or she is unavailable. As an example, if the sales agent takes a break, the sales agent may provide a user input indicating that he or she is not available and then provide another input indicating that he or she is available after returning to the primary workstation 156.

Also, if the sales agent at the primary workstation 156 is in a videoconference call, he or she may provide an input indicating whether the process of engaging the new customer should be handed-off to a secondary workstation 156. For example, in some cases, the sales agent may decide to engage the new customer after the current videoconference call is terminated. Allowing the sales agent at the primary workstation 156 to decide whether or not to hand-off the process of engaging a new customer gives this sales agent the flexibility of deciding whether it is better to hand-off such process or allow the sales agent at the primary workstation 156 to interact with the new customer.

Thus, according to the techniques described above, the sales agent at a primary workstation 156 for a given facility 12 is first notified of the presence of a new customer and has the first opportunity to engage the new customer. If such sales agent is unavailable because the sales agent is involved in a videoconference call, has temporarily left the primary workstation (e.g., is taking a break), or wishes to hand-off engagement of the new customer for any other reason, then a sales agent at another workstation 156 may be instructed or otherwise allowed to engage the new customer.

As noted above, after a videoconference call has occurred with a customer at a storage facility 12, the call may be terminated, and the sales agent in the call may perform various tasks, such as interacting with or monitoring customers at other facilities 12. Further, the customer in the call may similarly perform other activities, such as observing the sample storage spaces 258 (FIG. 9) or taking other actions for evaluating whether to rent a storage unit. In addition, at some point the customer may desire to speak with a sales agent again and provide an input via user input device 121 (FIG. 5) for establishing another videoconference call. In response to such input, the VC client controller 112 is configured to attempt to establish a videoconference call with the same sales agent that previously had a call with the customer. There are various techniques that may be used to try to achieve this.

In this regard, in some embodiments, when a videoconference call is first established with a customer, the VC client controller 112 (FIG. 5) participating in the call is configured to store an identifier of the VC server 25 in the call (e.g., a telephone number, IP address, or other types of information for enabling the VC client controller 112 to initiate a call with such VC server 25). In some embodiments, the identifier may be a key that can be used by the VC client controller 112 to lookup or otherwise find contact information (e.g., a telephone number, IP address, or other types of information for enabling the VC client controller 112 to initiate a call with the identified VC server 25).

When the VC client controller 112 later receives an input from the user input device 121 indicating that the customer desires to establish a call with a sales agent, the VC client controller 112 retrieves the VC server identifier stored from the last call and uses such identifier to attempt to establish a videoconference call with the identified VC server 25, noting that this is likely the VC server 25 that participated in the last call with the customer. Thus, the call will likely be established with the same sales agent that previously spoke to the customer. However, if such sales agent is unavailable for any reason, then the call may instead be established with another VC server 25 so that another sales agent can have a call with the customer, similar to the techniques described above for handing-off engagement of a customer to another sales agent.

In this regard, when the VC client 22 attempts to establish a call with the identified VC server 25, as described above, a call request may be sent from the VC client 22 to the identified VC server 25. If the sales agent at such VC server 25 is available, then the call may be established with this identified VC server 25. However, if the identified VC server 25 determines that the sales agent is unavailable, such as if the VC server 25 is currently in a videoconference call with another VC client 22, then the identified VC server 25 (or other component at the RAS 15) may forward the call request to another VC server 25 for the call.

In other embodiments, other techniques for establishing a videoconference call in response to user input at a VC client 22 are possible. As an example, the VC client controller 112 may be configured to attempt to establish a call with the same VC server 25 (e.g., the VC server 25 of the primary workstation 156 for the facility 12) each time the VC client controller 112 receives a user input for requesting a videoconference call.

In addition, in some embodiments, the VC client controller 112 may be configured to identify a customer attempting to request a videoconference call, and select a VC server 25 for the call based on the identity of the customer. In this regard, when a video call is established between a customer at a VC client 22 and a sales agent at a VC server 25, the VC client controller 112 may be configured to store an identifier of the customer and correlate the stored customer identifier with an identifier of the VC server 25 participating in the call. Thereafter, when the same customer provides a user input for requesting a new videoconference call, the VC client controller 112 may be configured to determine the identifier of the customer and use such identifier to lookup the identifier of the VC server 25 correlated with such customer identifier. The VC client controller 112 may then attempt to establish a videoconference call with such VC server 25. Thus, each time a videoconference call is requested by the same customer, the VC client controller 112 attempts to establish a videoconference call with the same VC server 25, thereby increasing the likelihood that the call will go to the same sales agent.

Note that there are various techniques that the VC client controller 112 may use to determine the identity of the customer. As an example, the customer may simply enter information (e.g., a user identifier) via the user input device 121 (FIG. 5) or otherwise to indicate the identity of the customer. In another example, the customer may carry a mobile communication device, such as a radio frequency (RF) tag or a smartphone, that is configured to wirelessly communicate with the VC client 22 to inform the VC client controller 112 of the identity of the customer. In yet another embodiment, the VC client controller 112 may be configured to analyze images captured by the camera 123 (FIG. 5) and identify unique features of the customer in the images. As an example, conventional facial recognition techniques may be used to identify the customer in the images. In other embodiments, the VC client 22 may have a biometric sensor, such as a fingerprint or retina sensor, for identifying the customer. Yet other techniques for identifying the customer are possible in other embodiments.

Note that the embodiments described above are exemplary, and various changes or modifications to the described embodiments are possible. As an example, it is unnecessary for multiple computing devices be used to implement a workstation 156. For example, it is possible for the functionality described above for a workstation 156 to be implemented by a single computing device (not shown) that is configured to perform the functions of the computing devices 190 and the VC server 25 described above. Such a single computing device may have a single display device for displaying the information output by the workstation 156, or the single computing device may have a plurality of display devices. As an example, each display device, like the computing devices 190 described above, may be associated with a respective facility 12 and display information from such facility 12 so that a sales agent may determine where a new customer is located by identifying which of the display devices is displaying the customer's image. In such embodiment, a single computing device may render to each of the multiple display devices and also establish videoconference calls as may be desired. In another example, video feeds from different facilities 12 may be displayed in different windows of the same display device. Yet other configurations are possible in other embodiments.

As an example, the use of videoconferencing is unnecessary. In this regard, the system 10 may operate as essentially described above except that teleconferencing is used, rather than videoconferencing, to communicate between customer and sales agents. In such an embodiment, a display device 129 may be omitted, and the customer may simply hear the voice of the sales agent without seeing his or her image. Similarly, the sales agent may hear the voice of the customer without seeing his or her image.

An exemplary use and operation of the system 10 will be described in more detail below.

In this regard, assume that a new customer enters the main office 250 (FIG. 9) of a storage facility 12 through the door 252. Upon entering the main office 250, the customer's presence is sensed by the sensor node 41'. As an example, the customer may be sensed by the proximity sensor 61 (FIG. 3) or based on images captured by the camera 63 (FIG. 3). In response, the sensor node 41' is configured to transmit an alert message indicative of the detection to the computing device 190 (FIG. 6) at the RAS 15 paired with the sensor node 41'. This computing device 190, which is at the primary workstation 156 for the facility 12, then emits an audible (e.g., a series of beeps) or visual (e.g., a textual message) alert to indicate to a sales agent at the primary workstation 156 that a new customer has possibly been detected.

As noted above, the computing device 190 providing the alert may be associated with the storage facility 12 such that the sales agent at the workstation 156 is aware that the information provided by this computing device 190 is from this facility 12. To facilitate such association, each computing device 190 may have a label attached to it indicating the name or other identifier (e.g., telephone number) of the associated storage facility 12.

In response to the alert emitted by the computing device 190 paired with the sensor node 41', the sales agent at the primary workstation 156 may view the image displayed by such computing device 190. As described above, this computing device 190 may be displaying a video stream of the scene captured by the sensor node 41'. Thus, by looking at the displayed image, the sales agent should be able to confirm whether a new customer has entered the main office 250.

If so, the sales agent may decide to initiate a videoconference call with the VC client 22 at the same storage facility 12 in order to engage the new customer. Thus, the sales agent may provide user inputs to the VC server 25 at the primary workstation 156 to establish a videoconference call between such VC server 25 and the VC client 22 at the storage facility 12. Thus, upon the customer entering the main office 250, an image of the sales agent may appear on the display device 129 (FIG. 9) viewable by the customer. Also, the sales agent and the customer may speak to each other in the videoconference call.

As an example, the sales agent may provide the customer with information about renting storage units, and if desired, the customer may ask questions to the sales agent. The sales agent may also explain that the facility 12 is remotely managed and that the customer may initiate a call back to the sales agent by simply providing a user input to the user input device 121 (FIG. 9), such as pushing a button for example. Thereafter, the videoconference call may be terminated.

After termination of the call, the sales agent may continue to monitor the actions of the customer by viewing the video feed captured by either of the sensor nodes 41' or 42", noting that such video feed is displayed by the computing device 190 paired with the these nodes 41' and 41". If the sales agent wishes to converse with the customer again, such as if the customer appears as though he or she has a questions or otherwise needs assistance, the sales agent may use the VC server 25 at the primary workstation 156 to establish a new videoconference call with the VC client 22 so that the sales agent and the customer may speak via the videoconference call. Alternatively, the sales agent may send a message via any of the sensor nodes 41' or 41" at the facility 12, as described above.

At some point, the customer may desire to speak to the sales agent again and, thus, provide a user input via the user input device 121 to request a call. In response, the VC client 22 may be configured to send a call request to the same VC server 25 used previously for a call, as described in more detail above. If the sales agent is available, such call request may be accepted by the sales agent using the VC server 25 of the primary workstation 156. Alternatively, if the sales agent is not available or otherwise does not wish to have the call, then the call request may be sent to the VC server of another workstation 156 so that a videoconference call may be established with another sales agent.

Eventually, the customer may decide to rent a storage unit at the facility 12. In such case, the customer may use a computing device 32 at the customer workstation 269 to provide information for use in renting the storage unit, such as personal information (e.g., name and address), payment information (e.g., credit card or debit card number), and any other information that may be requested by the owner of the facility 12. During this process, a videoconference call may be established with a sales agent using the techniques described above, and the sales agent may provide advice or information for use by the customer in providing the requested information.

Once the customer has provided the requested information, the customer may be provided instructions by the computing device 32 or otherwise (such as by the sales agent in a videoconference call) on how to access the rented storage unit. As an example, a location of a key for the storage unit may be indicated, thereby enabling the user to retrieve the key and use it to access the rented storage unit. In some embodiments, the storage units have locks that can be controlled by wireless signals. In such case, the customer can be instructed to download an application on his or her smartphone or other computing device, and the application may be configured to retrieve a digital key for the rented storage unit from a remote service, such as from the RAS controller 163 (FIG. 6), for example. The application may be configured to wirelessly transmit the digital key using Bluetooth or some other known wireless protocol to the lock of the rented storage unit to provide the customer access to the storage unit. In other embodiments, other techniques may be used to provide the customer with access to the rented storage unit.

By using techniques described herein, it is possible for a relatively large number of storage facilities 12 to be managed by a relatively small number of sales agents at one or more remote locations. Further, the system 10 for enabling remote management of the storage facilities may be implemented at a relatively low cost but with a rich customer experience so as to encourage customers to use the videoconferencing capabilities of the system 10 and increase the likelihood that the customers will want to rent storage units. By giving tools for the sales agents to monitor and interact with customers, as described herein, the sales agents can effectively address many of the problems associated with remote management of storage facilities, thereby reducing customer frustrations and apprehensions.

Now, therefore, the following is claimed:

1. A system for enabling remote management of storage facilities, comprising:
  a first videoconferencing (VC) client at a first storage facility, the first VC client having a first display device, a first camera, a first microphone and a first speaker;
  a second VC client at a second storage facility, the second VC client having a second display device, a second camera, a second microphone, and a second speaker;
  a first sensor node at the first storage facility, the first sensor node having a third camera;
  a second sensor node at the second storage facility, the second sensor node having a fourth camera; and
  a workstation for a sales agent, the workstation located at a remote location from the first storage facility and the second storage facility, the workstation comprising:
    a first computing device associated with the first storage facility and having a first Internet Protocol address, the first computing device configured to communicate directly with the first sensor node using a short-range wireless protocol for pairing with the first sensor node, thereby enabling communication with the first sensor node through a network, such that the first Internet Protocol address is stored at the first sensor node and used by the first sensor node to communicate a video stream from the third camera with the first computing device through the network, the first computing device having a first user interface configured to display the video stream from the third camera;
a second computing device associated with the second storage facility and having a second Internet Protocol address, the second computing device configured to communicate directly with the second sensor node using the short-range wireless protocol for pairing with the second sensor node, thereby enabling communication with the second sensor node through the network, such that the second Internet Protocol address is stored at the second sensor node and used by the second sensor node to communicate a video stream from the fourth camera with the second computing device through the network, the second computing device having a second user interface configured to display the video stream from the fourth camera; and
a VC server configured to selectively establish videoconference calls with the first VC client and the second VC client, thereby enabling a sales agent at the VC server to communicate in videoconferencing sessions with customers at the first storage facility and customers at the second storage facility, the VC server having (1) a third display device for displaying images from the first camera and the second camera for the videoconference calls, (2) a fifth camera for capturing images of the sales agent for the videoconference calls, (3) a third microphone for capturing verbal messages from the sales agent for the videoconference calls, and (4) a third speaker for emitting sound for the video conference calls, wherein the first user interface, the second user interface, and the third display device are positioned to be simultaneously viewable by the sales agent.

2. The system of claim 1, wherein the first sensor node is configured to sense a presence of a user at the first storage facility based on images captured by the third camera, and wherein the first sensor node is configured to transmit to the first computing device a first alert message in response to detection of the presence of the user by the first sensor node.

3. The system of claim 2, wherein the first computing device is configured to output an alert in response to the first alert message.

4. The system of claim 2, wherein the first VC client is configured to sense a presence of the user at the first storage facility based on images captured by the first camera, and wherein the first VC client is configured to transmit to the VC server a second alert message in response to detection of the presence of the user by the first VC client.

5. The system of claim 4, wherein the first computing device is configured to output an alert in response to the first alert message, and wherein the VC server is configured to output an alert in response to the second alert message.

6. The system of claim 1, wherein the first sensor node has a fourth speaker, wherein the first computing device is configured to receive a verbal message from the sales agent and transmit the verbal message to the first sensor node, and wherein the fourth speaker is configured to emit the verbal message.

7. The system of claim 1, wherein the first VC client has a user input device, wherein the first VC client is configured to store a first identifier for identifying the VC server, and wherein the first VC client is configured to establish a videoconference call with the VC server based on the stored first identifier in response to a user input received via the user input device.

8. The system of claim 7, wherein the first VC client is configured to correlate the first identifier with a second identifier for identifying a customer that provided the user input, wherein the first VC client is configured to identify the customer in response to the user input and to establish the videoconference call with the VC server based on identification of the customer by the VC client and correlation of the first identifier with the second identifier by the VC client.

9. The system of claim 1, wherein the first VC client has a user input device, wherein the first VC client is configured to store an identifier for identifying a VC server participating in the most recent videoconference call with the first VC client, and wherein the first VC client is configured to establish a videoconference call with the identified VC server based on the stored identifier in response to a user input received via the user input device.

10. The system of claim 1, wherein the short-range wireless protocol is Bluetooth.

11. A method for enabling remote management of storage facilities including at least a first storage facility and a second storage facility, the first storage facility having (1) a first videoconferencing (VC) client with a first display device, a first camera, a first microphone and a first speaker and (2) a first sensor node with a third camera, the second storage facility having (1) a second VC client with a second display device, a second camera, a second microphone, and a second speaker and (2) a second sensor node with a fourth camera, the method comprising:
providing a workstation for a sales agent, the workstation located at a remote location from the first storage facility and the second storage facility, the workstation comprising a VC server, a first computing device associated with the first storage facility, and a second computing device associated with the second storage facility, wherein the VC server has a third display device, a fifth camera, a third microphone, and a third speaker;
pairing the first computing device with the first sensor node for enabling communication between the first computing device and the first sensor node through a network, wherein the pairing the first computing device comprises communicating directly between the first sensor node and the first computing device using a short-range wireless protocol for exchanging Internet Protocol addresses between the first sensor node and the first computing device;
receiving at the first computing device a first video stream from the third camera, the first video stream transmitted through a network by the first sensor node using an Internet Protocol address of the first computing device received by the first sensor node from the first computing device during the paring the first computing device;
displaying the first video stream with a first user interface of the first computing device;
pairing the second computing device with the second sensor node for enabling communication between the second computing device and the second sensor node through the network, wherein the pairing the second computing device comprises communicating directly between the second sensor node and the second computing device using a short-range wireless protocol for exchanging Internet Protocol addresses between the second sensor node and the second computing device;
receiving at the second computing device a second video stream from the fourth camera, the second video stream transmitted through the network by the second sensor node using an Internet Protocol address of the second computing device received by the second sensor node from the second computing device during the paring the second computing device;

displaying the second video stream with a second user interface of the second computing device; and selectively establishing videoconference calls between the VC server and each of the first VC client and the second VC client, thereby enabling a sales agent at the VC server to communicate in videoconferencing sessions with customers at the first storage facility and customers at the second storage facility, wherein the first user interface, the second user interface, and the third display device are positioned to be simultaneously viewable by the sales agent.

12. The method of claim 11, further comprising:

sensing a presence of a user at the first storage facility with the first sensor node based on images captured by the third camera; and transmitting from the first sensor node to the first computing device a first alert message in response to the sensing.

13. The method of claim 12, further comprising outputting an alert with the first computing device in response to the first alert message.

14. The method of claim 12, further comprising:

sensing with the first VC client a presence of the user at the first storage facility based on images captured by the first camera; and transmitting from the first VC client to the VC server a second alert message in response to the sensing with the first VC client.

15. The method of claim 14, further comprising:

outputting an alert with the first computing device in response to the first alert message; and outputting an alert with the VC server in response to the second alert message.

16. The method of claim 12, further comprising initiating a video conference call between the VC server and the first VC client in response to the first alert message.

17. The method of claim 11, wherein the first sensor node has a fourth speaker, and wherein the method further comprises:

receiving with the first computing device a verbal message from the sales agent;

transmitting the verbal message from the first computing device to the first sensor node; and emitting the verbal message with the fourth speaker.

18. The method of claim 11, wherein the first VC client has a user input device, and wherein method further comprising:

storing with the first VC client a first identifier for identifying the VC server;

receiving a user input with the user input device; and establishing a videoconference call between the first VC client and the VC server based on the stored first identifier in response to the receiving.

19. The method of claim 18, further comprising identifying the customer with the first VC client, wherein the establishing the videoconference call between the first VC client and the VC server is based on the identifying.

20. The method of claim 11, wherein the first VC client has a user input device, and wherein the method further comprises:

storing with the first VC client an identifier for identifying a VC server participating in the most recent videoconference call with the first VC client;

receiving a user input with the user input device; and establishing a videoconference call between the first VC client and the identified VC server based on the stored identifier in response to the receiving.

21. The method of claim 11, further comprising moving the first computing device to the remote location subsequent to the pairing.

22. The method of claim 11, wherein the short-range wireless protocol is Bluetooth.

23. A method for enabling remote management of storage facilities including at least a first storage facility and a second storage facility, the first storage facility having (1) a first videoconferencing (VC) client with a first display device, a first camera, a first microphone and a first speaker and (2) a first sensor node with a third camera, the second storage facility having (1) a second VC client with a second display device, a second camera, a second microphone, and a second speaker and (2) a second sensor node with a fourth camera, the method comprising:

providing a workstation for a sales agent, the workstation located at a remote location from the first storage facility and the second storage facility, the workstation comprising a VC server, a first computing device associated with the first storage facility, and a second computing device associated with the second storage facility, wherein the VC server has a third display device, a fifth camera, a third microphone, and a third speaker;

pairing the first computing device with the first sensor node for enabling communication between the first computing device and the first sensor node through a network, wherein the first sensor node has a fourth speaker;

displaying a video stream from the third camera with a first user interface of the first computing device;

pairing the second computing device with the second sensor node for enabling communication between the second computing device and the second sensor node through the network;

displaying a video stream from the fourth camera with a second user interface of the second computing device; and selectively establishing videoconference calls between the VC server and each of the first VC client and the second VC client, thereby enabling a sales agent at the VC server to communicate in videoconferencing sessions with customers at the first storage facility and customers at the second storage facility, wherein the first user interface, the second user interface, and the third display device are positioned to be simultaneously viewable by the sales agent;

receiving with the first computing device a verbal message from the sales agent;

transmitting the verbal message from the first computing device to the first sensor node during a videoconference call between the VC server and the first VC client while the videoconference call is paused by the sales agent; and emitting the verbal message with the fourth speaker.

* * * * *